US009407935B2

(12) United States Patent
Rodriguez et al.

(10) Patent No.: US 9,407,935 B2
(45) Date of Patent: Aug. 2, 2016

(54) RECONSTRUCTING A MULTI-LATTICED VIDEO SIGNAL

(71) Applicant: Cisco Technology, Inc., San Jose, CA (US)

(72) Inventors: Arturo A. Rodriguez, Norcross, GA (US); Gregory Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 14/585,312

(22) Filed: Dec. 30, 2014

(65) Prior Publication Data

US 2015/0117552 A1 Apr. 30, 2015

Related U.S. Application Data

(62) Division of application No. 12/141,019, filed on Jun. 17, 2008, now Pat. No. 8,971,402.

(51) Int. Cl.
*H04N 19/895* (2014.01)
*H04N 21/262* (2011.01)
*H04N 19/65* (2014.01)
H04N 19/66 (2014.01)

(52) U.S. Cl.
CPC ............ *H04N 19/895* (2014.11); *H04N 19/65* (2014.11); *H04N 21/26275* (2013.01); *H04N 19/0086* (2013.01); *H04N 19/66* (2014.11)

(58) Field of Classification Search
CPC .................................................... H04N 19/895
USPC ..................................................... 375/240.01
See application file for complete search history.

(56) References Cited

U.S. PATENT DOCUMENTS

| 4,764,805 | A | 8/1988 | Rabbani et al. |
| 5,440,345 | A | 8/1995 | Shimoda |
| 5,606,359 | A | 2/1997 | Youden |
| 5,734,443 | A | 3/1998 | O'Grady |
| 5,734,783 | A | 3/1998 | Shimoda et al. |
| 5,828,370 | A | 10/1998 | Moeller et al. |

(Continued)

FOREIGN PATENT DOCUMENTS

| CA | 2693389 | 6/2014 |
| CN | 101129066 | 2/2008 |

(Continued)

OTHER PUBLICATIONS

U.S. Appl. No. 12/417,864, filed Apr. 3, 2009 entitled "System and Method for Authorization of Segment Boundary Notifications", Inventors: Theodore R. Grevers, Arturo A. Rodriguez, and Anthony J. Wasilewski.

(Continued)

*Primary Examiner* — Yulin Sun
(74) *Attorney, Agent, or Firm* — Merchant & Gould P.C.

(57) ABSTRACT

An apparatus for facilitating reception of multiple representations of a video signal. In one embodiment, the apparatus includes a mechanism for receiving plural representations of the video signal corresponding to plural decimated versions of the video signal, associating pictures of the received plural representations of the video signal, and outputting pictures corresponding to information from associated pictures in accordance with a relative temporal order.

20 Claims, 18 Drawing Sheets

(56) References Cited

U.S. PATENT DOCUMENTS

| | | |
|---|---|---|
| 5,854,873 A | 12/1998 | Mori et al. |
| 5,917,830 A | 6/1999 | Chen et al. |
| 5,917,988 A | 6/1999 | Eto |
| 5,943,447 A | 8/1999 | Tkhor et al. |
| 5,949,948 A | 9/1999 | Krause et al. |
| 5,963,260 A | 10/1999 | Bakhmutsky |
| 5,970,028 A | 10/1999 | Shimabukuro |
| 6,144,375 A | 11/2000 | Jain et al. |
| 6,160,889 A | 12/2000 | Yagasaki |
| 6,188,436 B1 | 2/2001 | Williams et al. |
| 6,201,927 B1 | 3/2001 | Commer |
| 6,222,979 B1 | 4/2001 | Willis et al. |
| 6,263,022 B1 | 7/2001 | Chen et al. |
| 6,304,714 B1 | 10/2001 | Krause |
| 6,310,915 B1 | 10/2001 | Wells et al. |
| 6,393,057 B1 | 5/2002 | Thoreau et al. |
| 6,411,725 B1 | 6/2002 | Rhoads |
| 6,421,387 B1 | 7/2002 | Rhee |
| 6,453,115 B1 | 9/2002 | Boyle |
| 6,512,552 B1 | 1/2003 | Subramanian |
| 6,587,506 B1 | 7/2003 | Noridomi et al. |
| 6,608,933 B1 | 8/2003 | Dowell |
| 6,643,327 B1 | 11/2003 | Wang |
| 6,658,199 B1 | 12/2003 | Hallberg |
| 6,754,373 B1 | 6/2004 | de Cuetos et al. |
| 6,785,289 B1 | 8/2004 | Ward et al. |
| 6,806,909 B1 | 10/2004 | Radha et al. |
| 6,906,743 B1 | 6/2005 | Maurer |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 6,999,424 B1 | 2/2006 | Kovacevic et al. |
| 7,027,713 B1 | 4/2006 | Hallberg |
| 7,050,603 B2 | 5/2006 | Rhoads et al. |
| 7,053,874 B2 | 5/2006 | Koyama |
| 7,085,322 B2 | 8/2006 | Ngai et al. |
| 7,085,381 B2 | 8/2006 | Kubota et al. |
| 7,085,424 B2 | 8/2006 | Kajiki et al. |
| 7,095,783 B1 | 8/2006 | Sotheran et al. |
| 7,096,481 B1 | 8/2006 | Forecast et al. |
| 7,113,523 B1 | 9/2006 | Kubota et al. |
| 7,129,962 B1 | 10/2006 | Cote et al. |
| 7,185,018 B2 | 2/2007 | Archbold |
| 7,224,730 B2 | 5/2007 | Kim et al. |
| 7,236,520 B2 | 6/2007 | Kim et al. |
| 7,239,801 B2 | 7/2007 | Himeno et al. |
| 7,243,193 B2 | 7/2007 | Walmsley |
| 7,317,839 B2 | 1/2008 | Holcomb |
| 7,376,335 B2 | 5/2008 | De Haan |
| 7,397,858 B2 | 7/2008 | Garrido et al. |
| 7,443,889 B2 | 10/2008 | Gonguet et al. |
| 7,467,297 B2 | 12/2008 | Ji et al. |
| 7,480,335 B2 | 1/2009 | Payson |
| 7,577,198 B2 | 8/2009 | Holcomb |
| 7,584,495 B2 | 9/2009 | Hannuksela et al. |
| 7,586,924 B2 | 9/2009 | Wiegand |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,720,145 B2 | 5/2010 | Muthukrishnan et al. |
| 7,733,910 B2 | 6/2010 | Mace et al. |
| 7,733,956 B1 | 6/2010 | Kalra et al. |
| 7,751,324 B2 | 7/2010 | Vadakital et al. |
| 7,793,329 B2 | 9/2010 | Joshi et al. |
| 7,809,059 B2 | 10/2010 | Yin et al. |
| 7,809,060 B2 | 10/2010 | Toma et al. |
| 7,889,788 B2 | 2/2011 | Toma et al. |
| 7,903,743 B2 | 3/2011 | Ho |
| 7,912,219 B1 | 3/2011 | Michener et al. |
| 8,102,406 B2 | 1/2012 | Peleg et al. |
| 8,136,140 B2 | 3/2012 | Hodge |
| 8,155,207 B2 | 4/2012 | Rodriguez et al. |
| 8,254,446 B2 | 8/2012 | Toma et al. |
| 8,259,814 B2 | 9/2012 | Rodriguez et al. |
| 8,259,817 B2 | 9/2012 | Rodriguez et al. |
| 8,265,154 B2 | 9/2012 | Gardner |
| 8,279,926 B2 | 10/2012 | Rodriguez et al. |
| 8,320,465 B2 | 11/2012 | Rodriguez et al. |
| 8,326,131 B2 | 12/2012 | Rodriguez et al. |
| 8,416,858 B2 | 4/2013 | Rodriguez et al. |
| 8,416,859 B2 | 4/2013 | Rodriguez et al. |
| 8,681,876 B2 | 3/2014 | Rodriguez et al. |
| 8,699,578 B2 | 4/2014 | Rodriguez et al. |
| 8,705,631 B2 | 4/2014 | Shepherd et al. |
| 8,718,388 B2 | 5/2014 | Rodriguez et al. |
| 8,761,266 B2 | 6/2014 | Rodriguez et al. |
| 8,782,261 B1 | 7/2014 | Rodriguez et al. |
| 8,804,843 B2 | 8/2014 | Rodriguez et al. |
| 8,804,845 B2 | 8/2014 | Rodriguez et al. |
| 8,873,932 B2 | 10/2014 | Rodriguez et al. |
| 8,875,199 B2 | 10/2014 | Rodriguez et al. |
| 8,886,022 B2 | 11/2014 | Rodriguez et al. |
| 8,949,883 B2 | 2/2015 | Rodriguez et al. |
| 8,958,486 B2 | 2/2015 | Rodriguez et al. |
| 8,971,402 B2 | 3/2015 | Rodriguez et al. |
| 2002/0071485 A1 | 6/2002 | Caglar et al. |
| 2002/0075402 A1 | 6/2002 | Robson et al. |
| 2002/0092017 A1 | 7/2002 | Klosterman et al. |
| 2002/0133819 A1 | 9/2002 | Jackson |
| 2002/0149591 A1 | 10/2002 | Van Der Vleuten et al. |
| 2002/0162111 A1 | 10/2002 | Shimizu et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0016876 A1 | 1/2003 | Chai et al. |
| 2003/0043847 A1 | 3/2003 | Haddad |
| 2003/0067479 A1 | 4/2003 | Jung et al. |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0121037 A1 | 6/2003 | Swix et al. |
| 2003/0123849 A1 | 7/2003 | Nallur |
| 2003/0135857 A1 | 7/2003 | Pendakur et al. |
| 2003/0161407 A1 | 8/2003 | Murdock et al. |
| 2003/0189982 A1 | 10/2003 | MacInnis |
| 2003/0195977 A1 | 10/2003 | Liu et al. |
| 2003/0206596 A1 | 11/2003 | Carver et al. |
| 2004/0010807 A1 | 1/2004 | Urdang et al. |
| 2004/0012510 A1 | 1/2004 | Chen |
| 2004/0028227 A1 | 2/2004 | Yu |
| 2004/0040035 A1 | 2/2004 | Carlucci et al. |
| 2004/0047469 A1 | 3/2004 | Ryan |
| 2004/0056884 A1 | 3/2004 | Eifrig et al. |
| 2004/0071354 A1 | 4/2004 | Adachi et al. |
| 2004/0078186 A1 | 4/2004 | Nair |
| 2004/0128578 A1 | 7/2004 | Jonnalagadda |
| 2004/0133908 A1 | 7/2004 | Smith et al. |
| 2004/0139462 A1 | 7/2004 | Hannuksela et al. |
| 2004/0177369 A1 | 9/2004 | Akins |
| 2004/0179619 A1 | 9/2004 | Tian et al. |
| 2004/0187160 A1 | 9/2004 | Cook |
| 2004/0210925 A1 | 10/2004 | Miyazawa et al. |
| 2004/0218816 A1 | 11/2004 | Hannuksela |
| 2004/0228413 A1 | 11/2004 | Hannuksela |
| 2004/0230994 A1 | 11/2004 | Urdang et al. |
| 2004/0257472 A1 | 12/2004 | Mpr et al. |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |

(56) References Cited

U.S. PATENT DOCUMENTS

| | | |
|---|---|---|
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0058201 A1 | 3/2005 | Fernandes |
| 2005/0069212 A1 | 3/2005 | Bottreau et al. |
| 2005/0084166 A1 | 4/2005 | Boneh et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 | 10/2005 | Secker |
| 2005/0226325 A1 | 10/2005 | Dei et al. |
| 2005/0226327 A1 | 10/2005 | Kim |
| 2005/0229225 A1 | 10/2005 | Klausberger et al. |
| 2005/0254498 A1 | 11/2005 | Itoh |
| 2005/0281329 A1 | 12/2005 | Chin |
| 2006/0013305 A1 | 1/2006 | Sun |
| 2006/0036551 A1 | 2/2006 | Oliveira et al. |
| 2006/0072597 A1 | 4/2006 | Hannuksela |
| 2006/0075449 A1 | 4/2006 | Jagadeesan et al. |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0104356 A1 | 5/2006 | Crinon |
| 2006/0109856 A1 | 5/2006 | Deshpande |
| 2006/0117357 A1 | 6/2006 | Surline |
| 2006/0120463 A1 | 6/2006 | Wang |
| 2006/0126728 A1 | 6/2006 | Yu et al. |
| 2006/0129914 A1 | 6/2006 | Ellis |
| 2006/0132822 A1 | 6/2006 | Walmsley |
| 2006/0133645 A1 | 6/2006 | Rhoads et al. |
| 2006/0147121 A1 | 7/2006 | Maeda et al. |
| 2006/0170571 A1 | 8/2006 | Martinian et al. |
| 2006/0188169 A1* | 8/2006 | Tener ............ G06T 5/20 382/254 |
| 2006/0222319 A1 | 10/2006 | Russ |
| 2006/0224763 A1 | 10/2006 | Altunbasak et al. |
| 2006/0227873 A1 | 10/2006 | Toebes et al. |
| 2006/0262861 A1 | 11/2006 | Kobayashi |
| 2006/0277566 A1 | 12/2006 | Vince et al. |
| 2006/0282319 A1 | 12/2006 | Maggio |
| 2006/0294171 A1 | 12/2006 | Bossen |
| 2007/0011447 A1 | 1/2007 | Murray et al. |
| 2007/0019724 A1 | 1/2007 | Tourapis |
| 2007/0025688 A1 | 2/2007 | Pejhan |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0038921 A1 | 2/2007 | Pekonen et al. |
| 2007/0053665 A1 | 3/2007 | Kato |
| 2007/0081586 A1 | 4/2007 | Raveendran et al. |
| 2007/0091997 A1 | 4/2007 | Fogg et al. |
| 2007/0101359 A1 | 5/2007 | Schiller et al. |
| 2007/0106760 A1 | 5/2007 | Houh et al. |
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1* | 6/2007 | Joshi ............ G06T 15/08 382/232 |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0186240 A1 | 8/2007 | Ward et al. |
| 2007/0194975 A1 | 8/2007 | Jang et al. |
| 2007/0223595 A1 | 9/2007 | Hannuksela et al. |
| 2007/0230460 A1 | 10/2007 | Jeong et al. |
| 2007/0230496 A1 | 10/2007 | Guo et al. |
| 2007/0245382 A1 | 10/2007 | Doi et al. |
| 2007/0250890 A1 | 10/2007 | Joshi |
| 2007/0253490 A1* | 11/2007 | Makino ............ H04N 19/00072 375/240.24 |
| 2007/0280350 A1 | 12/2007 | Mathew et al. |
| 2007/0286280 A1 | 12/2007 | Saigo et al. |
| 2007/0292107 A1 | 12/2007 | Yahata et al. |
| 2007/0297460 A1 | 12/2007 | Muneishi et al. |
| 2008/0022340 A1 | 1/2008 | Hannuksela et al. |
| 2008/0025399 A1 | 1/2008 | Le Leannec et al. |
| 2008/0037656 A1 | 2/2008 | Hannuksela |
| 2008/0037658 A1 | 2/2008 | Price et al. |
| 2008/0037957 A1 | 2/2008 | Nallur et al. |
| 2008/0055463 A1* | 3/2008 | Lerner ............ H04N 21/2365 348/420.1 |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |
| 2008/0225850 A1 | 9/2008 | Oran et al. |
| 2008/0225951 A1 | 9/2008 | Young |
| 2008/0235722 A1 | 9/2008 | Baugher et al. |
| 2008/0244658 A1 | 10/2008 | Chen |
| 2008/0247463 A1 | 10/2008 | Buttimer |
| 2008/0256409 A1 | 10/2008 | Oran et al. |
| 2008/0260045 A1 | 10/2008 | Rodriguez et al. |
| 2008/0263581 A1 | 10/2008 | Turner |
| 2008/0273596 A1 | 11/2008 | Oguz et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1 | 1/2009 | Wang et al. |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Shuh |
| 2009/0028447 A1 | 1/2009 | Yatabe et al. |
| 2009/0033791 A1 | 2/2009 | Rodriguez |
| 2009/0034627 A1 | 2/2009 | Rodriguez et al. |
| 2009/0034633 A1 | 2/2009 | Rodirguez et al. |
| 2009/0041130 A1 | 2/2009 | Yoon et al. |
| 2009/0073928 A1 | 3/2009 | Power |
| 2009/0086816 A1 | 4/2009 | Leontaris et al. |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0196571 A1 | 8/2009 | Rodriguez et al. |
| 2009/0199231 A1 | 8/2009 | Tsuria et al. |
| 2009/0201988 A1 | 8/2009 | Gazier et al. |
| 2009/0207904 A1 | 8/2009 | Pandit et al. |
| 2009/0210412 A1 | 8/2009 | Oliver |

(56) References Cited

U.S. PATENT DOCUMENTS

| | | |
|---|---|---|
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0074340 A1 | 3/2010 | Luo et al. |
| 2010/0088717 A1 | 4/2010 | Candelore et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |
| 2012/0263228 A1 | 10/2012 | Rodriguez et al. |
| 2013/0028314 A1 | 1/2013 | Rodriguez et al. |
| 2014/0226730 A1 | 8/2014 | Rodriguez et al. |
| 2014/0307804 A1 | 10/2014 | Rodriguez et al. |
| 2014/0351854 A1 | 11/2014 | Rodriguez et al. |
| 2015/0016549 A1 | 1/2015 | Rodriguez et al. |
| 2015/0016806 A1 | 1/2015 | Rodriguez et al. |
| 2015/0127847 A1 | 5/2015 | Rodriguez et al. |
| 2015/0189303 A1 | 7/2015 | Rodriguez et al. |
| 2015/0189332 A1 | 7/2015 | Rodriguez et al. |

FOREIGN PATENT DOCUMENTS

| | | |
|---|---|---|
| CN | 2009 8 0145072.2 | 7/2014 |
| EP | 0 812 112 A2 | 12/1997 |
| EP | 1 292 138 A2 | 3/2003 |
| EP | 1 328 119 A1 | 7/2003 |
| EP | 1 480 460 A1 | 11/2004 |
| JP | 05-236465 A | 9/1993 |
| KR | 10-2004-0054708 A | 6/2004 |
| WO | WO 00/00981 A2 | 1/2000 |
| WO | WO 00/62552 A2 | 10/2000 |
| WO | WO 01/01702 | 1/2001 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | 2006/073207 A2 | 7/2006 |
| WO | WO 2006/083824 A2 | 8/2006 |
| WO | WO 2006/101979 A | 9/2006 |
| WO | WO 2006/114761 A1 | 11/2006 |
| WO | 2008/005040 A1 | 1/2008 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Appl. No. 12/492,117, filed Jun. 25, 2009 entitled "Support for Blocking Trick Mode Operations", Inventors: Arturo A. Rodriguez and Benjamin M. Cook.

U.S. Appl. No. 12/483,925, filed Jun. 12, 2009 entitled "Picture Interdependencies Signals in Context of MMCO to Assist Stream Manipulation", Inventors: Arturo A. Rodriguez and Benjamin M. Cook.

U.S. Appl. No. 12/417,868, filed Apr. 3, 2009 entitled "Segment Boundary Notification to a Digital Media Receiver", Inventors: Theodore R. Grevers, Arturo A. Rodriguez, and Anthony J. Wasilewski.

U.S. Appl. No. 12/417,869, filed Apr. 3, 2009 entitled "System and Method for Processing Segment Boundary Notifications", Inventors: Theodore R. Grevers, Arturo A. Rodriguez, and Anthony J. Wasilewski.

U.S. Appl. No. 12/709,851, filed Feb. 22, 2010 entitled "Signalling of Decodable Sub-Sequences", Inventor: Arturo A. Rodriguez.

U.S. Appl. No. 12/713,153, filed Feb. 25, 2010 entitled "Signalling of Auxiliary Information that Assists Processing of Video According to Various Formats", Inventors: Rodriguez et al.

U.S. Appl. No. 12/722,117, filed Mar. 11, 2010 entitled "Management of Picture Referencing in Video Streams for Plural Playback Modes", Inventors: Walton et al.

U.S. Appl. No. 12/779,035, filed May 12, 2010 entitled "Signalling Buffer Characteristics for Splicing Operations of Video Streams", Inventors: Rodriguez et al.

U.S. Appl. No. 12/616,974, filed Nov. 12, 2009, entitled "Error Concealment of Plural Processed Representations of a Single Video Signal Received in a Video Program", Rodriguez et al.

U.S. Appl. No. 12/616,991, filed Nov. 12, 2009, entitled "Processing Latticed and Non-Latticed Pictures of a Video Program", Rodriguez et al.

U.S. Appl. No. 12/617,015, filed Nov. 12, 2009, entitled "Facilitating Fast Channel Changes Through Promotion of Pictures", Rodriguez et al.

U.S. Appl. No. 12/617,043, filed Nov. 12, 2009, entitled "Targeted Bit Appropriations Based on Picture Importance", Rodriguez et al.

U.S. Appl. No. 12/617,062, filed Nov. 12, 2009, entitled "Processing of a Video Program Having Plural Processed Representations of a Single Video Signal for Reconstruction and Output", Rodriguez et al.

U.S. Appl. No. 12/141,015, filed Jun. 17, 2008, entitled "Time-Shifted Transport of Multi-Latticed Video for Resiliency from Burst-Error Effects", Shepherd et al.

U.S. Appl. No. 12/141,017, filed Jun. 17, 2008, entitled "Methods and Systems for Processing Multi-Latticed Video Streams", Rodriguez et al.

U.S. Appl. No. 12/141,019, filed Jun. 17, 2008, entitled "Processing of Impaired and Incomplete Multi-Latticed Video Streams", Rodriguez et al.

U.S. Appl. No. 12/819,157, filed Jun. 18, 2010, entitled "Dynamic Streaming with Latticed Representations of Video", Rodriguez et al.

U.S. Appl. No. 13/633,672, filed Oct. 2, 2012, entitled "Dynamic Streaming Plural Lattice Video Coding Representations of Video," Rodrigeuz et al.

U.S. Appl. No. 14/253,043, filed Apr. 15, 2014, entitled "Methods and Systems for Processing Latticed Time-Skewed Video Streams," Rodrigeuz et al.

U.S. Appl. No. 14/313,266, filed Jun. 24, 2014, entitled "Receiving and Processing Multi-Latticed Video", Rodriguez et al.

U.S. Appl. No. 14/502,651, filed Sep. 30, 2014, entitled "Determining Tracking Picture Candidates with Multiple Level Tiers", Rodriguez et al.

Amon et al., "File Format for Scalable Video Coding", IEEE Transactions on Circuits and Systems for Video Technology, vol. 17 No. 9, Sep. 2007, pp. 1174-1185.

Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.

(56) References Cited

OTHER PUBLICATIONS

Hurst et al., "MPEG Splicing Tutorial and Proposed SMPTE Standard", Proceedings of the SMPTE Technical Conference, Nov. 1997, pp. 105-117.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.
ITU-T Telecommunication Standardization Sector of ITU, Infrastrcture of Audiovisual Services—Coding of Moving Video, "Advanced Video Coding for Generic Audiovisual Services", International Telecommunication Union, H.264, May 2003, XP008095420, 282 pages.
Luo et al., "On HRD conformance for splice bitstreams", JVT Meeting, Document JVT-V055r1, Filename JVT-V055r1.doc, XP-30006863, Jan. 2007, pp. 1-11.
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11,.
Rodriguez et al., "SEI message to convey suitable splice points in the bitstream", JVT Meeting, Document JVT-Z040, Filename JVT-Z040.doc, XP-30007329, Jan. 2008, pp. 1-8.
"Splice Points for MPEG-2 Transport Streams", SMPTE Journal, SMPTE Inc., vol. 107 No. Oct. 1998, XP-000793004, pp. 916-925.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
Tian et al., "Sub-Sequence Video Coding for Improved Temporal Scalability", presented at the *IEEE International.Symposium on Circuits and Systems—ISCAS*, pp. 6074-6077, 2005.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005, pp. 6-13.
Psannis K. et al., "Efficient Flexible Macroblock Ordering Technique," IEICE Transactions on Communications, Communications Society, Tokyo JP, vol. E19B, No. 8, Aug. 1, 2008, pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. Conf. 16, Apr. 14, 1991, pp. 2857-2860.
Schwarz H. et al., "SVC Overview," 21. JVT Metting; 78. MPEG Meeting; Oct. 20, 2006-Oct. 27, 2006; Hangzhou CN; (Joint Video Team of ISO/IEC JTC1/SC29/WG11 and ITU-T SG.16), No. JVT-U145, Oct. 20, 2006, 20 pages.
Yao Wang et al., "Error Control and Concealment for Video Communication: A Review," Proceedings of the IEEE, New York, vol. 86, No. 5, May 1, 1998, 24 pages.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 23, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
International Preliminary Report on Patentability and Written Opinion dated Feb. 2, 2010 cited in International Application No. PCT/US2008/071111.
International Search Report and Written Opinion dated Apr. 15, 2010 cited in International Application No. PCT/US2010/024927.
PCT Search Report cited in International Appln No. PCT/US2009/064180 mailed Jan. 8, 2010.
PCT Written Opinion cited in International Appln No. PCT/US2009/064180 mailed Jan. 8, 2010.
PCT Search Report cited in International Appln No. PCT/US2009/047521 mailed Dec. 22, 2009.
PCT Written Opinion cited in International Appln No. PCT/US2009/047521 mailed Dec. 22, 2009.
Canadian Office Action dated Dec. 11, 2009 in Application No. 2,533,169.
European Examination dated May 4, 2010 in Application No. 07 844 937.8.
European Examination dated Sep. 16, 2010 in Application No. 08 796 875.6.
European Communication dated Aug. 9, 2011 in Application No. 08 838 787.3, 4 pages.
European Communication dated Sep. 22, 2011 in Application No. 08796584.4, 9 pages.
European Communication dated Dec. 14, 2011 in Application No. 09 751 294.1, 5 pages.
Chinese First Office Action mailed Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
U.S. Non-final Office Action in U.S. Appl. No. 10/623,683 dated Dec. 28, 2007.
U.S. Final Office Action in U.S. Appl. No. 10/623,683 dated Jul. 25, 2008.
U.S. Non-Final Office Action in U.S. Appl. No. 11/627,452 dated Nov. 10, 2010.
U.S. Non-Final Office Action in U.S. Appl. No. 11/831,916 dated Feb. 1, 2010.
U.S. Non-Final Office Action in U.S. Appl. No. 11/831,916 dated Aug. 4, 2010.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Non-Final Office Action in U.S. Appl. No. 12/417,864 dated Apr. 18, 2011, 25 pages.
U.S. Final Office Action mailed Jul. 5, 2011 in U.S. Appl. No. 12/417,864, 13 pages.
U.S. Non-Final Office Action mailed Aug. 5, 2011 in U.S. Appl. No. 11/831,906, 38 pages.
U.S. Final Office Action mailed Aug. 5, 2011 in U.S. Appl. No. 12/417,869, 10 pages.
U.S. Non-Final Office Action mailed Sep. 14, 2011 in U.S. Appl. No. 12/124,779, 29 pages.
U.S. Non-Final Office Action mailed Sep. 22, 2011 in U.S. Appl. No. 11/831,912, 35 pages.

(56) References Cited

OTHER PUBLICATIONS

U.S. Final Office Action mailed Sep. 28, 2011 in U.S. Appl. No. 11/831,916, 44 pages.
U.S. Non-Final Office Action mailed Nov. 10, 2011 in U.S. Appl. No. 12/483,925, 36 pages.
U.S. Non-Final Office Action mailed Nov. 23, 2011 in U.S. Appl. No. 12/141,015, 30 pages.
U.S. Non-Final Office Action mailed Nov. 29, 2011 in U.S. Appl. No. 12/492,117, 35 pages.
U.S. Non-Final Office Action mailed Nov. 23, 2011 in U.S. Appl. No. 12/141,017, 32 pages.
U.S. Non-Final Office Action mailed Dec. 21, 2011 in U.S. Appl. No. 12/333,296, 30 pages.
U.S. Non-Final Office Action mailed Dec. 22, 2011 in U.S. Appl. No. 12/617,043, 34 pages.
U.S. Non-Final Office Action mailed Dec. 27, 2011 in U.S. Appl. No. 12/417,869, 8 pages.
U.S. Non-Final Office Action mailed Dec. 27, 2011 in U.S. Appl. No. 12/252,632, 31 pages.
U.S. Non-Final Office Action mailed Jan. 4, 2012 in U.S. Appl. No. 12/617,062, 30 pages.
U.S. Non-Final Office Action mailed Jan. 10, 2012 in U.S. Appl. No. 12/333,301, 37 pages.
U.S. Non-Final Office Action mailed Jan. 18, 2012 in U.S. Appl. No. 12/617,015, 31 pages.
U.S. Final Office Action mailed Jan. 19, 2012 in U.S. Appl. No. 12/124,779, 12 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 13, 2012 in U.S. Appl. No. 11/831,906, 24 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. Appl. No. 12/333,296, 21 pages.
U.S. Final Office Action mailed May 23, 2012 in U.S. Appl. No. 12/333,301, 18 pages.
U.S. Final Office Action mailed Jun. 11, 2012 in U.S. Appl. No. 12/141,017, 23 pages.
U.S. Final Office Action mailed Jun. 4, 2012 in U.S. Appl. No. 12/252,632, 22 pages.
U.S. Non-Final Office Action mailed Jun. 15, 2012 in U.S. Appl. No. 12/124,779, 12 pages.
U.S. Non-Final Office Action mailed Jun. 20, 2012 in U.S. Appl. No. 12/722,117, 30 pages.
U.S. Non-Final Office Action mailed Jun. 25, 2012 in U.S. Appl. No. 12/417,868, 37 pages.
U.S. Final Office Action mailed Jul. 6, 2012 in U.S. Appl. No. 12/617,043, 26 pages.
U.S. Non-Final Office Action mailed Jul. 10, 2012 in U.S. Appl. No. 12/417,869, 8 pages.
U.S. Final Office Action mailed Jul. 16, 2012 in U.S. Appl. No. 12/351,776, 6 pages.
U.S. Non-Final Office Action mailed Jul. 18, 2012 in U.S. Appl. No. 12/616,991, 25 pages.
U.S. Non-Final Office Action mailed Aug. 10, 2012 in U.S. Appl. No. 12/483,925, 35 pages.
U.S. Final Office Action mailed Nov. 27, 2012 in U.S. Appl. No. 12/616,991, 34 pages.
U.S. Final Office Action mailed Feb. 26, 2013 in U.S. Appl. No. 12/141,019, 14 pages.
U.S. Non-Final Office Action mailed Oct. 1, 2013 in U.S. Appl. No. 12/616,991, 18 pages.
U.S. Non-Final Office Action mailed Dec. 13, 2013 in U.S. Appl. No. 12/141,019, 8 pages.
U.S. Office Action mailed Jan. 2, 2014 in U.S. Appl. No. 12/483,925, 47 pages.
U.S. Office Action mailed Jan. 16, 2014 in U.S. Appl. No. 12/333,296, 18 pages.
U.S. Office Action mailed Jan. 27, 2014 in U.S. Appl. No. 12/492,117, 23, pages.
U.S. Office Action mailed Jan. 29, 2014 in U.S. Appl. No. 12/252,632, 22 pages.
U.S. Office Action mailed Jan. 30, 2014 in U.S. Appl. No. 12/722,117, 22 pages.
U.S. Office Action mailed Feb. 10, 2014 in U.S. Appl. No. 12/713,153, 18 pages.
U.S. Office Action mailed Feb. 13, 2014 in U.S. Appl. No. 13/633,672, 5 pages.
U.S. Office Action mailed Mar. 21, 2014 in U.S. Appl. No. 11/831,906, 20 pages.
U.S. Office Action mailed Mar. 28, 2014 in U.S. Appl. No. 12/417,869, 12 pages.
U.S. Non-Final Office Action mailed May 1, 2014 in U.S. Appl. No. 12/779,035, 21 pages.
U.S. Office Action mailed Jun. 20, 2014 in U.S. Appl. No. 12/417,868, 41 pgs.
U.S. Office Action mailed Jun. 20, 2014 in U.S. Appl. No. 13/633,672, 7 pgs.
U.S. Office Action mailed Jul. 14, 2014 in U.S. Appl. No. 12/722,117, 31 pgs.
U.S. Office Action mailed Jul. 25, 2014 in U.S. Appl. No. 12/713,153, 29 pgs.
U.S. Office Action mailed Aug. 14, 2014 in U.S. Appl. No. 12/252,632, 23 pgs.
U.S. Office Action mailed Aug. 27, 2014 in U.S. Appl. No. 12/492,117, 37 pgs.
U.S. Office Action mailed Aug. 28, 2014 in U.S. Appl. No. 12/417,869, 11 pgs.
U.S. Final Office Action mailed Sep. 17, 2014 in U.S. Appl. No. 12/351,776, 29 pgs.
U.S. Appl. No. 14/457,236, filed Aug. 12, 2014, entitled "Managing Splice Points for Non-Seamless Concatenated Bitstreams", Rodriguez et al.
U.S. Appl. No. 14/501,905, filed Sep. 30, 2014, entitled "Signaling Tier Information to Assist MMCO Stream Manipulation", Rodriguez et al.
U.S. Appl. No. 14/591,037, filed Jan. 7, 2015, entitled "Splice Signalling Buffer Characteristics", Rodriguez et al.
U.S. Appl. No. 14/593,098, filed Jan. 9, 2015, entitled "Mitigating Impairments in Redundant Streams", Rodriguez et al.
Chinese First Office Action mailed Aug. 31, 2012 in Application No. 200980118689.5, 12 pages.
Chinese First Office Action mailed Feb. 21, 2013 in Application No. 200980145072.2, 16 pages.
European Communication dated Mar. 22, 2013 in Application No. 09 826 735.4, 7 pages.
European Communication dated Mar. 22, 2013 in Application No. 09 767 598.7, 5 pages.
European Communication dated Oct. 15, 2013 in Application No. 09 767 598.7, 6 pages.
Chinese Second Office Action mailed Oct. 25, 2013 in Application No. 200980145072.2, 4 pages.
Chinese Office Action mailed Nov. 13, 2013 in Appln No. 200980124140.7, 15 pgs.
European Communication mailed Jul. 3, 2014 in Appln No. 07 756 849.1, 4 pgs.

(56) References Cited

OTHER PUBLICATIONS

Canadian Office Action mailed Jul. 7, 2014 in Appln No. 2,669,552, 3 pgs.
Chinese Second Office Action mailed Jul. 14, 2014 in Application No. 200980124140.7, 7 pgs.
U.S. Non-Final Office Action mailed Sep. 13, 2012 in U.S. Appl. No. 12/141,015, 22 pages.
U.S. Non-Final Office Action mailed Oct. 2, 2012 in U.S. Appl. No. 12/417,864, 17 pages.
U.S. Non-Final Office Action mailed Oct. 22, 2012 in U.S. Appl. No. 12/779,035, 33 pages.
U.S. Final Office Action mailed Nov. 23, 2012 in U.S. Appl. No. 12/417,869, 16 pages.
U.S. Final Office Action mailed Dec. 19, 2012 in U.S. Appl. No. 12/722,117, 24 pages.
U.S. Final Office Action mailed Jan. 4, 2013 in U.S. Appl. No. 12/417,868, 19 pages.
U.S. Non-Final Office Action mailed Jan. 24, 2013 in U.S. Appl. No. 12/713,153, 41 pages.
U.S. Non-Final Office Action mailed Feb. 26, 2013 in U.S. Appl. No. 12/617,043, 31 pages.
U.S. Final Office Action mailed Feb. 28, 2013 in U.S. Appl. No. 12/483,925, 37 pages.
U.S. Final Office Action mailed Mar. 18, 2013 in U.S. Appl. No. 12/141,015, 23 pages.
U.S. Final Office Action mailed Mar. 18, 2013 in U.S. Appl. No. 12/417,864, 13 pages.
U.S. Non-Final Office Action mailed Mar. 20, 2013 in U.S. Appl. No. 11/831,912, 17 pages.
U.S. Final Office Action mailed Apr. 8, 2013 in U.S. Appl. No. 12/779,035, 19 pages.
U.S. Non-Final Office Action mailed Apr. 9, 2013 in U.S. Appl. No. 12/831,906, 22 pages.
U.S. Non-Final Office Action mailed Apr. 9, 2013 in U.S. Appl. No. 12/492,117, 20 pages.
U.S. Non-Final Office Action mailed Apr. 9, 2013 in U.S. Appl. No. 11/627,452, 11 pages.
U.S. Final Office Action mailed Jun. 6, 2013 in U.S. Appl. No. 12/617,043, 27 pages.
U.S. Final Office Action mailed Jun. 19, 2013 in U.S. Appl. No. 12/713,153, 19 pages.
U.S. Non-Final Office Action mailed Jun. 21, 2013 in U.S. Appl. No. 12/483,925, 40 pages.
U.S. Non-Final Office Action mailed Jul. 3, 2013 in U.S. Appl. No. 13/443,580, 25 pages.
U.S. Non-Final Office Action mailed Jul. 16, 2013 in U.S. Appl No. 12/333,296, 32 pages.
U.S. Non-Final Office Action mailed Jul. 18, 2013 in U.S. Appl. No. 12/417,864, 14 pages.
U.S. Non-Final Office Action mailed Aug. 7, 2013 in U.S. Appl. No. 12/333,301, 20 pages.
U.S. Final Office Action mailed Sep. 6, 2013 in U.S. Appl. No. 12/492,117, 27, pages.
U.S. Non-Final Office Action mailed Sep. 6, 2013 in U.S. Appl. No. 13/633,672, 22 pages.
U.S. Non-Final Office Action mailed Sep. 11, 2013 in U.S. Appl. No. 12/722,117, 21 pages.
U.S. Final Office Action mailed Sep. 26, 2013 in U.S. Appl. No. 11/831,912, 25 pages.
U.S. Final Office Action mailed Nov. 12, 2013 in U.S. Appl. No. 11/627,452, 22 pages.
U.S. Final Office Action mailed Nov. 13, 2013 in U.S. Appl. No. 11/831,906, 32 pages.
U.S. Final Office Action mailed Dec. 4, 2013 in U.S. Appl. No. 13/443,580, 9 pages.
U.S. Non-Final Office Action mailed Dec. 24, 2013 in U.S. Appl. No. 12/779,035, 15 pages.
U.S. Office Action mailed Nov. 6, 2014 in U.S. Appl. No. 12/417,868, 41 pgs.
U.S. Office Action mailed Nov. 6, 2014 in U.S. Appl. No. 13/633,672, 7 pgs.
U.S. Office Action mailed Dec. 10, 2014 in U.S. Appl. No. 12/722,117, 28 pgs.
Zhu et al., "Coding and Cell-Loss Recovery in DCT-Based Packet Video," IEEE Transactions on Circuits and Systems for Video Technology, Jun. 3, 1993, New York U.S., 11 pages.
U.S. Appl. No. 14/658,293, filed Mar. 16, 2015, entitled "Assistance for Processing Pictures in Concatenated Video Streams", Rodriguez et al.
U.S. Office Action mailed May 28, 2015 in U.S. Appl. No. 12/252,632, 29 pgs.
U.S. Office Action mailed Aug. 13, 2015 in U.S. Appl. No. 14/457,236, 49 pgs.
U.S. Office Action mailed Aug. 31, 2015 in U.S. Appl. No. 14/253,043, 57 pgs.
U.S. Office Action mailed Nov. 25, 2015 in U.S. Appl. No. 12/252,632, 26 pgs.
U.S. Notice of Allowance mailed Jan. 29, 2016 in U.S. Appl. No. 14/253,043, 18 pgs.
U.S. Office Action mailed Feb. 17, 2016 in U.S. Appl. No. 14/457,236, 20 pgs.

* cited by examiner

| V0 00 | V1 01 | V0 02 | V1 03 | V0 04 | V1 05 | V0 06 | V1 07 | ... 0j |
|---|---|---|---|---|---|---|---|---|
| V2 10 | V3 11 | V2 12 | V3 13 | V2 14 | V3 15 | V2 16 | V3 17 | |
| V0 20 | V1 21 | V0 22 | V1 23 | V0 24 | V1 25 | V0 26 | V1 27 | |
| V2 30 | V3 31 | V2 32 | V3 33 | V2 34 | V3 35 | V2 36 | V3 37 | |
| V0 40 | V1 41 | V0 42 | V1 43 | V0 44 | V1 45 | V0 46 | V1 47 | ⋮ |
| V2 50 | V3 51 | V2 52 | V3 53 | V2 54 | V3 55 | V2 56 | V3 57 | |
| V0 60 | V1 61 | V0 62 | V1 63 | V0 64 | V1 65 | V0 66 | V1 67 | |
| V2 70 | V3 71 | V2 72 | V3 73 | V2 74 | V3 75 | V2 76 | V3 77 | |
| i0 | | | | ... | | | | ij |

| V0 00 | V1 01 | V2 02 | V3 03 | V0 04 | V1 05 | V2 06 | V3 07 | ... | 0j |
|---|---|---|---|---|---|---|---|---|---|
| V2 10 | V3 11 | V0 12 | V1 13 | V2 14 | V3 15 | V0 16 | V1 17 | | |
| V0 20 | V1 21 | V2 22 | V3 23 | V0 24 | V1 25 | V2 26 | V3 27 | | |
| V2 30 | V3 31 | V0 32 | V1 33 | V2 34 | V3 35 | V0 36 | V1 37 | | |
| V0 40 | V1 41 | V2 42 | V3 43 | V0 44 | V1 45 | V2 46 | V3 47 | | ⋮ |
| V2 50 | V3 51 | V0 52 | V1 53 | V2 54 | V3 55 | V0 56 | V1 57 | | |
| V0 60 | V1 61 | V2 62 | V3 63 | V0 64 | V1 65 | V2 66 | V3 67 | | |
| V2 70 | V3 71 | V0 72 | V1 73 | V2 74 | V3 75 | V0 76 | V1 77 | | |
| ⋮ | | | | | ... | | | ⋱ | |
| i0 | | | | | | | | | ij |

| V0 00 | V1 01 | V2 02 | V3 03 | V0 04 | V1 05 | V2 06 | V3 07 | ... | 0j |
|---|---|---|---|---|---|---|---|---|---|
| V2 10 | V3 11 | V0 12 | V1 13 | V2 14 | V3 15 | V0 16 | V1 17 | | |
| V0 20 | V1 21 | V2 22 | V3 23 | V0 24 | V1 25 | V2 26 | V3 27 | | |
| V2 30 | V3 31 | V0 32 | V1 33 | V2 34 | V3 35 | V0 36 | V1 37 | | |
| V0 40 | V1 41 | V2 42 | V3 43 | V0 44 | V1 45 | V2 46 | V3 47 | | ⋮ |
| V2 50 | V3 51 | V0 52 | V1 53 | V2 54 | V3 55 | V0 56 | V1 57 | | |
| V0 60 | V1 61 | V2 62 | V3 63 | V0 64 | V1 65 | V2 66 | V3 67 | | |
| V2 70 | V3 71 | V0 72 | V1 73 | V2 74 | V3 75 | V0 76 | V1 77 | | |

182 brackets rows on left i0 ... ij

FIG. 10

| V0 00 | V1 01 | V0 02 | V1 03 | V0 04 | V1 05 | V0 06 | V1 07 |
|---|---|---|---|---|---|---|---|
| V2 10 | V3 11 | V2 12 | V3 13 | V2 14 | V3 15 | V2 16 | V3 17 |
| V1 20 | V0 21 | V1 22 | V0 23 | V1 24 | V0 25 | V1 26 | V0 27 |
| V3 30 | V2 31 | V3 32 | V2 33 | V3 34 | V2 35 | V3 36 | V2 37 |
| V0 40 | V1 41 | V0 42 | V1 43 | V0 44 | V1 45 | V0 46 | V1 47 |
| V2 50 | V3 51 | V2 52 | V3 53 | V2 54 | V3 55 | V2 56 | V3 57 |
| V1 60 | V0 61 | V1 62 | V0 63 | V1 64 | V0 65 | V1 66 | V0 67 |
| V3 70 | V2 71 | V3 72 | V2 73 | V3 74 | V2 75 | V3 76 | V2 77 |

RECONSTRUCTING A MULTI-LATTICED VIDEO SIGNAL

CROSS-REFERENCE TO RELATED APPLICATION

This application is a divisional of U.S. patent application Ser. No. 12/141,019, filed Jun. 17, 2008, now U.S. Pat. No. 8,971,402, issued Mar. 3, 2015, which is entirely incorporated herein by reference.

BACKGROUND

The present disclosure relates generally to data transfer in digital networks and more specifically to improving error detection, correction, and/or concealment in digital video transmissions over digital networks.

Transfer of video stream over digital networks includes several aspects, such as video compression, error correction, and data-loss concealment for various types of communications networks and systems. Such applications often require robust systems and methods that facilitate data transport with minimal data loss or perceived data loss. Systems for minimizing data loss or perceived data loss are particularly important in applications such as video-broadcast applications using packet-switched networks, such as the Internet, where large burst errors are common. Burst errors in packet-switched Internet Protocol (IP) networks may result from various mechanisms, including differences in IP routing times for different data packets transferred via the IP network. Unfortunately, conventional systems and methods for facilitating robust data transfer with minimal data loss or perceived data loss often cannot accommodate relatively large data losses without requiring excessive network bandwidth and memory.

BRIEF DESCRIPTION OF THE DRAWINGS

FIG. 2 is a diagram illustrating a first example partitioning of a video frame by the system of FIG. 1.

FIG. 3b is a second example timing diagram illustrating example transmission timing of video data from a group of video frames corresponding to a video segment (t2) of FIG. 3a.

FIG. 7 is a diagram illustrating a second example partitioning of a video frame by the system of FIG. 1.

FIG. 10 is diagram of the example video frame partitioned in accordance with the video partitioning illustrated in FIG. 7 and showing an example data-loss pattern for the data-loss interval of FIG. 3a for a third video segment.

FIG. 11 is a diagram illustrating a third example partitioning of a video frame by the system of FIG. 1.

DESCRIPTION OF EXAMPLE EMBODIMENTS

Overview

Figure 1:
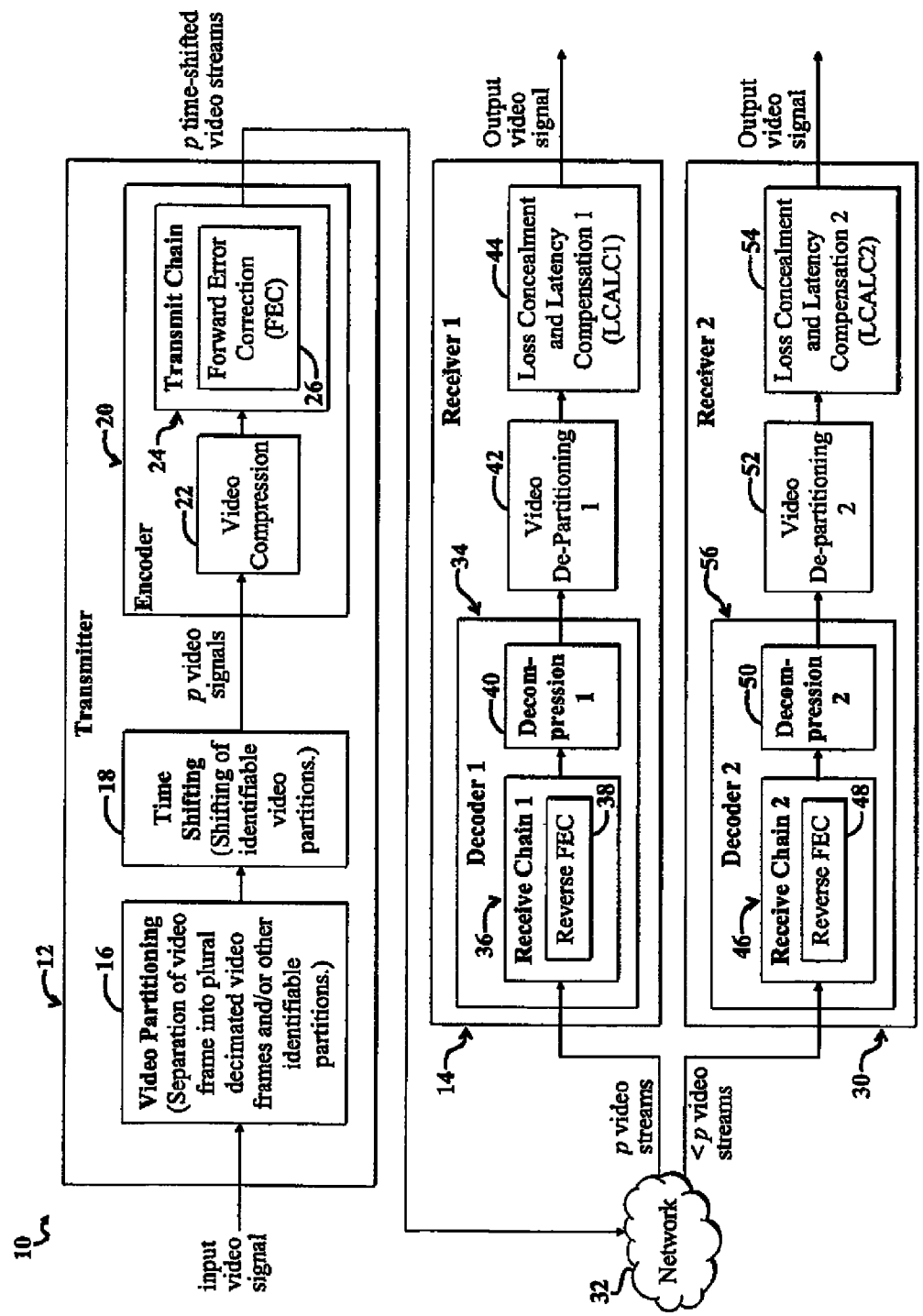
FIG. 1 is a diagram of a communications system employing video partitioning, time shifting, and Forward Error Correction (FEC) according to an example embodiment.

One embodiment of the invention maps a frame of a video signal with a plurality of matrices. For the purposes of the present discussion, a matrix may be any grouping of pixels or data associated therewith. A pixel may include one or more values associated with a data point, where a data point may be a smallest displayable element or portion of a video frame. A video frame may be any collection of data used to facilitate constructing an image or representation thereof.

Each matrix may have a small number of pixels, n, such as, for example, where n=4, there are 4 pixels in a matrix. Note that in a specific embodiment n=p, where p represents the number of resulting streams, as discussed more fully below. Hence, a corresponding n number of streams are formed, and the streams are transmitted over a network or channel in a time-skewed and/or time-interleaved manner, as discussed more fully below.

In a specific embodiment, an apparatus for processing and transmitting visual information is disclosed. Visual information may be any information from an information source such as from a camera, scanned from film, or synthetically created to form an image or portion thereof. The terms "visual information" and "image data" are employed interchangeably herein. In a specific embodiment, the apparatus includes a first mechanism for mapping plural matrices onto a video frame. A matrix is said to be mapped onto a video frame when a particular set or group of video data, such as video data corresponding to pixels, from the video frame is associated with or assigned to the matrix.

A second mechanism distributes n pixels in each matrix into n corresponding decimated versions of the input video signal. A decimated version of a video signal may be any version of a video signal that represents a subset of video data from the original or input video signal. The decimated versions of the input video signal are also called video partitions, latticed versions, lattices of the input video signal, or subsampled versions herein. Frames of a decimated version of an input video signal are also called latticed frames, subsampled frames, decimated frames, or frame partitions. In general, the term "lattice" may describe a partition of a video signal, wherein each lattice of the video signal may include pixel information corresponding to a particular set of pixel locations in frames of a video signal. A particular set of pixel locations is called a sampling region.

Note that video decimating, subsampling, partitioning, or latticing may introduce aliasing in the video signal, which may be removed via one or more filter operations, such as anti-aliasing filters.

A third mechanism provides n streams from the n decimated video signals according to a first relative temporal order. Each of the n decimated video signals corresponds to a respective lattice, partition, decimated version, or subsampled version of the input video signal. For the purposes of the present discussion, a stream may be any successively transmitted or received data, such as, but not limited to, compressed video frames of a video signal in a transmission order in accordance with the syntax and semantics of a video compression specification, such as Part 10 of the Moving Picture Experts Group (MPEG)-4 standard. A temporal order may specify a temporal relationship between one or more segments (e.g., a segment labeled t1, as discussed more fully below) of a first version of a video signal occurring in a first stream (e.g., a stream labeled S1, as discussed more fully below) and one or more corresponding segments (e.g., a segment labeled t1) of a second version of the video signal occurring in a second stream (e.g., a stream labeled S2, as discussed more fully below). Note that for the purposes of the present discussion, a video signal may be partitioned, decimated, subsampled, or latticed into multiple versions that may be processed or compressed into multiple corresponding streams, and the multiple streams may be collectively called a digital video signal or a video signal. Furthermore, each of the multiple streams may also be called a video signal.

A fourth mechanism implements instructions for changing the first relative temporal order to a second relative temporal order different from the first relative temporal order. The second relative temporal order is said to be a time-skewed and/or time-interleaved version of the first relative temporal order. For example, a first set of streams characterized by a first temporal order may include various segments in a first order or temporal relationship. A corresponding second set of streams with a second temporal order may include the various segments of the first set of streams, wherein the various segments are in a different temporal relationship, such that the order of the segments are skewed or separated by different time intervals than they are in the first set of streams.

An example method includes receiving a video signal with one or more video frames; partitioning each of the one or more video frames of the video signal into plural decimated video frames; and then separating or processing the respective sequences of decimated video frames into one or more identifiable video streams. Each of the one or more identifiable video streams may be segmented into consecutive segments, wherein each consecutive segment comprises of one or more consecutive compressed video frames. In the present example method, each compressed video frame is associated with n decimated video frames, where n represents the number of pixels in a matrix, i.e., specific grouping of pixels, that is mapped contiguously over the non-decimated video frame. Segments of each of the one or more identifiable video streams are strategically shifted in time relative to corresponding segments of one or more other identifiable video streams. This time shifting or skewing occurs before transmission to facilitate error correction and/or error concealment, as discussed more fully below. Transmission of the one or more identifiable video streams results in time-shifted transport of multi-latticed video.

Example Embodiments

A more specific embodiment implements an apparatus for separating a video signal into plural identifiable lattices, also called error-concealment partitions, decimated versions, or subsampled versions. Such lattices are not to be confused with the layers of a scalable video coding method. Each of these latticesis associated with, or "assigned," pixel data from a corresponding set of pixel locations, also referred to as a "sampling region," in each frame of the video signal. Each lattice includes pixel information from particular decimated versions of video frames, and a given decimated version of a video frame is included within a particular lattice of the video signal. Each set of sampled pixel locations providing a distinct decimated video frame is said to form a lattice of pixels, also called a latticed frame or sub-frame, in the given video frame. The multiple latticed frames of video frames of a given video signal determine respective sequences of decimated video frames that may be processed and transmitted as separate streams. Each separate sequence of decimated video frames is called a lattice of the original or input video signal and is compressed and segmented into consecutive video segments, and Forward Error Correction (FEC) processing is applied thereto, as discussed more fully below. Each separate sequence of decimated video frames of the input video signal is a respective independent representation of the video signal. The pictures of each respective representation may be processed or compressed independently from other representations of the input video signal. Thus, each respective representation of the video signal is an independent representation of the video signal since it may be processed or compressed independently of the other remaining representations of the video signal. Each resulting sub-video stream (i.e., a decimated version of the video signal in compressed form), may be processed or decompressed independently of the other sub-video streams.

Each segment of a stream or segment of a video signal can include one or more consecutive video frames in their transmission order. The consecutive video frames may be compressed video frames. A compressed video frame may be any frame to which a compression algorithm or other operation has been applied to reduce the number of bits used to represent the video frame. Each of the consecutive video frames in a given video stream corresponds to a respective decimated video frame derived from a frame of an original or input video signal. Video frames in different streams are said to correspond with each other if they are respective decimated versions or representations derived from a same video frame in the original or input video signal.

Corresponding segments in separate streams, as described below, may be shifted in time relative to each other so that a data loss during a given time interval will not corrupt all of the decimated video frames associated with a given frame of the input video signal. Consequently, missing or corrupted portions of a frame, such as a compressed frame, may be concealed via various mechanisms, including linear or nonlinear interpolation or frame upscaling, at the receiver as discussed more fully below. Hence, this embodiment combines error correction and error concealment to facilitate resilient robust transport of video over a lossy channel or network, such as an Internet Protocol (IP) packet-switched network. Certain embodiments discussed herein may be particularly useful in applications involving broadcasting video via packet-switched networks, also called over-the-top video transmission.

Note that FEC techniques may be applied to a given data stream to be transmitted over a network. Application of FEC to a data stream involves adding redundant data to the data stream to reduce or eliminate the need to retransmit data in the event of certain types of data loss. The redundant data facilitates reconstructing the data stream at a receiver in the event of data loss. Data may be lost due to noise, differing IP routing convergence times, Raleigh fading in wireless networks, and so on. Application of FEC to a data stream may also include the correction of lost data or other errors in a data stream using the redundant data.

Unfortunately, due to excessive overhead and bandwidth constraints of many communications systems, certain conventional FEC systems often do not correct or adequately compensate for large losses, such as burst correlated losses of more than 500 milliseconds. This may result, for example, in undesirable blank frames in transported video and corresponding black screens in the resulting displayed video signal. Such problems may be addressed by certain embodiments discussed herein.

For clarity, various well-known components, such as video amplifiers, network cards, routers, Internet Service Providers (ISPs), Internet Protocol SECurity (IPSEC) concentrators, Media GateWays (MGWs), filters, multiplexers or demultiplexers, transport streams, and so on, have been omitted from the figures. However, those skilled in the art with access to the present teachings will know which components to implement and how to implement them to meet the needs of a given application.

For the purposes of the present discussion, electronically transported data may be any data that is communicated from a first location to a second location via electromagnetic energy. Examples of electronically transported data include data transferred over packet-switched networks via Internet Protocol (IP), data transferred via circuit-switched networks, such as the Public Switched Telephone Network (PSTN), and data transferred wirelessly using a wireless protocol, such as Code Division Multiple Access (CDMA), Advanced Mobile Phone Service (AMPS), WiFi (Wireless Fidelity), WiMAX (Worldwide Interoperability for Microwave Access), and Bluetooth protocols.

FIG. 1 is a diagram of a communications system 10 employing video partitioning, time shifting, and Forward Error Correction (FEC) according to an example embodiment. The communications system 10 includes a transmitter 12 in communication with a first receiver 14 and a second receiver 30. For the purposes of the present discussion, a communications system may be any device or collection of devices that contains one or more components that intercommunicate or are otherwise adapted to intercommunicate.

The transmitter 12 includes a video-partitioning module 16, which is coupled to a video time-shifting module 18. The video time-shifting module 18 is coupled to a video encoder 20. Although the video time-shifting module 18 is shown prior to video-compression module 22, other embodiments may perform a time-shifting function at different points in a processing path. For example, an alternate embodiment may have the video time-shifting module 18 at the output of video-compression module 22. Other arrangements are possible.

The video encoder 20 includes a video-compression module 22, which is coupled to a transmit chain 24. The transmit chain 24 includes an FEC module 26. In one embodiment, the transmitter 12 includes filtering capabilities in the video-partitioning module 16. Such filtering capabilities may include linear, non-linear, or anti-aliasing filtering capabilities.

A first decimated video frame is said to correspond to a second decimated video frame if they both originated from the same frame of the input video signal. That is, the video-partitioning module 16 produced the first and second decimated frames from the same frame of the input video signal, and, thus both decimated frames correspond temporally to the same instance or interval of time for display or output purposes. Likewise, a plurality of corresponding decimated video frames refers to a plurality of decimated video frames that originated from the same frame of the input video signal and correspond temporally to the same instance or interval of time for display or output purposes.

A compressed video frame in a first video stream is said to correspond to a compressed video frame in a second video stream if both of these compressed video frames prior to being compressed were corresponding decimated frames (i.e., both originated from the same frame of the input video signal). Likewise, respective compressed video frames in a plurality of video streams are said to be corresponding compressed video frames if each of them originated from the same frame of the input video signal. Depending on the embodiment, partitioning of frames may occur before or during their compression. Depending on the embodiment, time-shifting of frames or video segments may occur before, during, or after their compression. Depending on the embodiment, partitioning and time-shifting may or may not occur in the same processing module of transmitter 12.

For purposes of illustrating a particular embodiment, let frame (k, v) represent the k-th frame in transmission order of a given video stream v such that frame (k, 1) is the k-th video frame in a first video stream; frame (k, 2) is the corresponding k-th frame in a second video stream; and frame (k, p) is the corresponding k-th frame in the p-th video stream. For nf (number of frames) equal to a positive integer, a segment of nf consecutive frames of the first video stream is said to correspond temporally to a segment of nf consecutive frames of the second video stream if for each integer value of k from 1 to nf, the respective k-th frames in transmission order are corresponding frames. Similarly, a plurality of segments in respective video streams are said to be temporal corresponding segments, or just corresponding segments, if all possible pairing of two of the plurality of segments are temporal corresponding segments. That is, p video segments are said to be corresponding segments if: (1) each of the p segments has the same number of frames, nf, and (2) in transmission order, for each integer value of k from 1 to nf, the kth frame in each of the p segments is a corresponding frame to the respective kth frames in the other (p−1) segments.

Video compression module 22 outputs the successive compressed video frames in each of the p video streams in accordance with the syntax and semantics of a video coding specification. Encoder 20 may specify use of a transport stream into which multiple streams of a video signal are multiplexed via the transmit chain 24 before transmission over the network 32. The transmission order of the successive compressed video in a video stream may or may not equal the display or output order of the frames. For example, in certain applications, a future reference frame may be required to be transmitted prior to a frame having an earlier display or output time, but that depends on the decoded version of that future reference frame for its reconstruction. The video compression module 22 effects compression of the p decimated video signals such that the relative transmission order of the successive compressed video frames in each of the corresponding p video streams is the same. However, in the present embodiment, although the relative transmission order of the frames within each of the p video streams is the same, as explained below, each set of p corresponding video segments is transmitted in accordance with a second relative temporal order, which is a skewed or time-shifted version of a first relative temporal order.

The transmitter 12 is coupled to the first receiver 14 and the second receiver 30 via a network 32. The network 32 may be the Internet, a wireless network, or other type of network or communications channel(s). Although multiple receivers or decoders are described herein, other embodiments may use a single decoder or receiver for one or more video streams.

The first receiver 14 includes a first decoder 34, which is coupled to a first video-de-partitioning module 42, which is coupled to a first loss-concealment and latency-compensation module (LCALCM1) 44. The first decoder 34 includes a first receive chain 36, which includes a first reverse-FEC module 38. The first receive chain 36 is coupled to a first video-decompression module 40 in the first decoder 34. The first decoder 34 is coupled to the first video-de-partitioning module 42, which is coupled to the first loss-concealment and latency-compensation module 44. The second receiver 30 is similar to the first receiver 14, with the exception that the second receiver 30 is adapted to subscribe to a subset of the video streams to which the first receiver 14 subscribes, and may include certain filtering capabilities not included in first receiver 14, such as frame upscaling capabilities, or additional or different frame upscaling capabilities.

For the purposes of the present discussion, a video stream may be any successively transmitted portions of video data, such as, but not limited to, the compressed video frames of a video stream in a transmission order that is in accordance with the syntax and semantics of a video compression specification. One example video stream includes a series of sequentially transmitted video packets. Transmission of a video frame may require transmission of multiple video packets.

In one embodiment, plural separate video streams are multiplexed into a single transport stream and then transmitted over a single transmission channel. Auxiliary information is provided in the transport stream to identify the video streams. The auxiliary information may include information indicating how decoded versions of compressed video frame partitions are to be assembled into a larger frame to be displayed or output. The auxiliary information may also include information indicating the relative temporal order of latticed frames and corresponding segments in the transport stream, as discussed more fully below.

In an alternative embodiment, a video stream includes plural sub-video streams packetized and appropriately multiplexed within the video stream, such as by interspersing video packets carrying the corresponding lattices in their compressed form in the video stream to effect a parallel or simultaneous transmission of plural decimated video frames, i.e., latticed frames, via the sub-video streams. In this embodiment, each of the sub-video streams corresponds to a respective partition of the input video signal. Auxiliary information in the video streams provides identification information that conveys spatial relationships of the lattices and the relative temporal order of the compressed video segments or compressed video frame partitions. For the purposes of the present discussion, the relative temporal order of video segments and/or frames (or sub-frames) in a video stream may specify the actual order of the start, end, or completion of each set of corresponding video segments and/or each corresponding frame in the video stream and may further specify the time intervals between the start, end, or completion of each video segment in the video stream and/or of each frame in the video stream. When the sequence of compressed frames is transmitted over a channel, the relative order of transmitted frames may be called the relative temporal transmission order, relative transmission order, or relative temporal order. The relative temporal order of video segments or frames is said to be relative, since they are ordered or positioned for transmission with respect to each other in intervals of time or in intervals of consecutive frames of the input video signal.

Plural video streams that are transmitted in parallel are not necessarily transmitted simultaneously or multiplexed over a common transmission channel. In another embodiment, plural video streams corresponding respectively to video partitions are transmitted in parallel over two different transmission channels between a first location and a second location with the appropriate synchronization provisions as well as the identification information. Such channels are called parallel channels.

The second receiver 30 includes a second receive chain 46, which includes a second reverse FEC module 48. A second decoder 56 includes a second reverse FEC module 48 and a second video-decompression module 50. The second decoder 56 is coupled to a second video-de-partitioning module 52. The second video-de-partitioning module 52 is coupled to a second video concealment and latency-compensation module (LCALC2) 54.

The loss-concealment and latency-compensation modules 44, 54 are error-concealment modules. For the purposes of the present discussion, an error-concealment module may be any entity that is adapted to disguise an impairment in a video stream, such as omitted data, lost data, impaired data, or data that has not yet been received by a receiver, or other errors occurring in the transmission or reception of a video stream. Herein, an impairment refers to omitted data, lost data, impaired data, or data that has not yet been received by a receiver, or to other errors occurring in the transmission or reception of a video stream.

The LACLM1 44 and LACLM2 54 include filtering capabilities, such as linear, non-linear or anti-aliasing filtering capabilities to effect upscaling of a decoded video frame. The filtering capabilities in the LACLM1 44 and LACLM2 54 may compensate for lost data, impaired data, or non-received data. For example, filtering capabilities may be employed to upscale at least a portion of a decoded frame in a first video stream to conceal an impairment in a corresponding frame of a second video stream. For the purposes of the present discussion, data is said to be upscaled when deriving or replicating data to compensate for an impairment of data.

The filtering capabilities in the LACLM1 44 or LACLM2 54 may be employed to upscale at least a portion of a decoded version of frame (k, 1) that spatially-corresponds to the impaired portion of frame (k, 2). Some or possibly all of the generated pixel values in the upscaled version of decoded frame (k, 1) are used to compensate for the corresponding pixels of at least one impaired portion of the decoded version of frame (k, 2) or the whole of frame (k, 2) if frame (k, 2) was completely impaired or undecodable.

In one embodiment, when frame (k, 2) is impaired, a single decoded non-impaired frame, e.g., frame (k, 1), is upscaled in LACLM1 44 or LACLM2 54 to compensate for the respective one or more spatially-corresponding impaired portions in frame (k, 2). Alternatively or in addition, when frame (k, 2) exhibits one or more partial-frame impairments, one or more portions of a single decoded non-impaired frame, e.g., frame (k, 1), are upscaled in LACLM1 44 or LACLM2 54 to compensate for the respective spatially-corresponding impaired portions in frame (k, 2).

In another embodiment, p video streams and identification information are received at the first receiver 14. Filtering capabilities in LACLM1 44 are used to upscale the decoded versions of (p–1) corresponding non-impaired frames to compensate for one or more impairments in the corresponding frame of the p-th video stream. For the purposes of the present discussion, the respective k-th frames in each of p received video streams are considered corresponding video frames. The relative temporal order of the p corresponding k-th video frames is determined by the first receiver 14 from the received identification information, i.e., auxiliary information, which may be included in a transport stream. The relative temporal order of the p corresponding k-th frames may be determined by the first receiver 14 from the received identification information that identifies the relative temporal order of the p corresponding video segments. The corresponding p video frames are decoded by the first decoder 36 in accordance with their relative temporal order. The spatial relationships of the decoded versions of the p corresponding k-th video frames are also determined by the first receiver 14 from the same received identification information.

In an alternate embodiment, the spatial relationships of the decoded versions of the p corresponding k-th video frames are determined by the first receiver 14 from additional or different auxiliary information that differs from the received identification information described above. A composite or assembled video frame of the same spatial resolution as the input video signal to the transmitter 12 is formed by the first video de-partitioning module 42 in accordance with the spatial relationships determined from the identification information or from the additional or different auxiliary information. One or more of the (p–1) corresponding decoded frames are individually upscaled in the LACLM1 44 to compensate for one or more impairments in the k-th frame of the p-th video stream. Similarly, when two corresponding frames in two different received video streams exhibit impairments, one or more of the (p–2) corresponding decoded frames are individually upscaled to compensate for the impairments. The second receiver 30 may operate similarly to the first receiver 14 with the exception that the second receiver 30 receives or subscribes to less than p video streams, as discussed more fully below.

Note that various couplings between modules and groupings of modules shown in FIG. 1 are for illustrative purposes. Those skilled in the art may employ different couplings and groupings without departing from the scope of the present teachings. For example, the encoder 20 may include the video-partitioning module 16 and the time-time shifting module 18. In addition, the FEC module 26 may be included before and/or after the video compression module 22 and may also be considered part of the encoder 20. The exact couplings and order of various modules of FIG. 1 are application specific and may be readily changed to meet the needs of a given application by those skilled in the art without undue experimentation.

In one embodiment, the first receiver 14 and the second receiver 30 are housed within one physical receiver capable of receiving and processing two video transport streams, where each transport stream includes multiple sub-video streams, simultaneously. In this embodiment, one or more of the similar or same functional modules in the first receiver 14 and the second receiver 30 may be performed by the same or common physical processing device.

In operation, the video-partitioning module 16 receives a video signal as input. In the present embodiment, the input video signal is a digitized and uncompressed video signal that is ingested as a sequence of digitized pictures, or video frames, in their temporal display or output order and in accordance with a digital video or video interface specification. The digital video or video interface specification may specify use of a pixel clock, a picture format, a number of pictures per second, a pixel format, and/or the scan or serial order of the pixels of video frames, or other attributes and values. The scan format of the input video may correspond to a progressive or interlaced video signal. The resulting ingested video signal is said to include or represent video data. The exact picture format, number of pictures per second, pixel format, and scan format of the received video data may be application specific. Different types of video formats may be used for different applications.

For the purposes of the present discussion, video data may be any data comprising a video signal. A video signal may be any sequence of one or more pictures or image data that can be displayed. Image data may be any information born from a camera, scanned from film, or synthetically created to form an image or portion thereof. An image may be a visual representation of anything. A video frame may be any collection of image data used to facilitate constructing an image or representation thereof. The collection of data may include plural pixels of information, where a pixel may include one or more values associated with a data point, where a data point may be a smallest displayable element or portion of a video frame. The terms "picture", "frame,", "video frame," and "image frame" are employed interchangeably herein A video-partitioning module, such as the module 16, may be any hardware and/or software device, collection of devices, or other entity that is adapted to identify, separate, or mark different lattices, i.e., partitions, of a video signal. The video-partitioning module 16 includes circuitry and instructions, which may include one or more software and/or hardware routines for selectively latticing the input frames of the input video signal, thereby separating the input frames of the input video signal into different decimated frames, called latticed frames. In the specific embodiment of FIG. 1, the video-partitioning module 16 samples each input frame to obtain smaller latticed frames. The latticed frames include pixel information from particular sampling regions, which represent sets of predetermined spatial locations of pixels, where the pixels are selected from matrices of each input frame.

Pixels of each frame are grouped into matrices. In one example embodiment, the matrices of a frame include 4.times.4 non-overlapping groups of adjacent or contiguous pixels. The assignment of pixels of a frame to matrices may be considered a two-dimensional mapping of non-overlapping contiguous matrices on a frame.

In another example embodiment, each frame of video data in a video signal is separated into p (e.g., four) sampling regions or partitions, where each of the p sampling regions corresponds to one of p different decimated video signals, i.e., lattices, output by the video-partitioning module 16. Each of the p partitions, i.e., lattices, corresponds to a set of pixel locations representative of a sampling region. The actual pixels (or values associated with the pixels) at the pixel locations of particular sampling regions of input frames represent pixels of a lattice. The pixels of a sampling region for a single frame represent a latticed frame. A lattice may include multiple latticed frames, which together represent a partition of a video signal. In the present specific embodiment, partitions or lattices of a video signal are conveyed via streams, called sub-video streams or sub-streams. The sub-streams may be transmitted across the network 32 in a one or more collective streams, such as a single transport stream, depending on the particulars of a given implementation.

The pixels selected for each of the p lattices are dispersed across a frame in accordance with the mapping of the non-overlapping contiguous n-pixels matrices on the frame. For example, in one operational mode where the number (n) of pixels in each matrix is four (n=4) and the number (p) of partitions or streams (also called sub-video streams or sub-streams) formed from the input video signal is four (p=4), a video frame with a picture resolution of 640 pixels in the horizontal and 480 pixels in the vertical is mapped with a 320 by 240 grid of 2.times.2 matrices, and thus, the video frame is divided into different groups (matrices) of four pixels. Each 2.times.2 matrix contains four "adjacent" or neighboring pixels per the meaning of adjacency described below. Each pixel in a 2.times.2 matrix is allocated to one of the four lattices, i.e., partitions, which are each conveyed via one of the four streams. Note that a video frame may be mapped with matrices of different sizes and shapes other than 2.times.2 pixel matrices without departing from the scope of the present teachings.

A pixel is said to be spatially adjacent, or adjacent, to another pixel if they are positioned directly next to each other, either horizontally or vertically. In an alternate embodiment, pixels may be also considered adjacent if diagonally next to each other. For example, two pixels may be considered adjacent if at least one corner of a first pixel is adjacent to at least one corner of a second pixel.

Each matrix in the mapped two-dimensional grid of non-overlapping contiguous matrices on an input video frame corresponds to a sampling region, where the sampling region represents the locations of the pixels of the matrix. The shape of a sampling region corresponding to a mapped matrix may be square, rectangular, linear, or polygonal. In the present specific embodiment, the sampling regions have horizontal and vertical edges as defined relative to edges of a frame. For example, if a rectangular frame is tilted, the edges of sampling regions within the tilted frame are still considered to be horizontal or vertical.

Two adjacent mapped matrices separate adjacent pixels located across their horizontal or vertical edges. In one embodiment, each mapped matrix in a video frame is adjacent to at least one other mapped matrix. Alternatively, each mapped matrix in a video frame is adjacent to at least two other different mapped matrices. Alternatively, each mapped matrix in a video frame is horizontally adjacent to at least one other mapped matrix and vertically adjacent to at least one other mapped matrix. Alternatively, each mapped interior matrix in a video frame is adjacent to at least four other different mapped matrices. The borders of an interior matrix do not coincide with or are not adjacent to any portion of a video frame's borders.

In one embodiment, all of the mapped matrices onto a frame have the same shape and size. In an alternative embodiment, alternating mapped matrices in scan order differ in size. In another embodiment, the alternating mapped matrices in scan order differ in shape. In yet another embodiment, the alternating matrices in scan order differ in shape and size. Hence, successive mapped matrices in scan order may differ in shape and/or size without departing from the scope of the present teachings.

In one embodiment, the mapped matrices onto a frame do not overlap. In an alternative embodiment, the mapped matrices onto a frame overlap. Hence, mapped matrices may or may not spatially overlap.

Each mapped matrix contains n pixels that are distributed by the video partitioning module 16 into p partitions or lattices. In one embodiment, the number of pixels in a mapped matrix equals the number of partitions (i.e., n=p), and each partition has the same number of pixels. That is, each of the p distinct decimated versions of the input video signal has the same spatial frame resolution. In an alternative embodiment, p is less than n, and n/p is an integer, and the p partitions have the same spatial frame resolution. That is, the video-partitioning module 16 may distribute (n/p) pixels from each mapped matrix into each of the p partitions.

In yet another embodiment, p is less than n, and n divided by p does not equal an integer number, and at least one of the p partitions has a spatial frame resolution that is different from the respective spatial frame resolution of the other decimated video signals.

Note that in certain embodiments or implementations, the video-partitioning module 16 may include methods or instructions for selectively adjusting the subsampling patterns or mapped matrices employed by the video-partitioning module 16 according to one or more predetermined criteria. For example, the subsampling patterns may be selected so that any data loss is more easily concealed or disguised based on one or more characteristics of human perception. For example, humans may not be able to perceive an improvised reconstruction of lost pixel data occurring along a diagonal direction of pixels in a frame or display screen as easily as they may be able to perceive lost pixel data occurring horizontally or vertically across a display screen. Accordingly, the subsampling patterns may be selected to force data losses within a predetermined time interval to occur in patterns other than horizontal or vertical lines, as discussed more fully below.

In the present specific embodiment of FIG. 1, the video-partitioning module 16 outputs p separate decimated video signals derived from the input video signal, which may be in the form of a sequence of digitized uncompressed frames in the native frame display order of the input video signal.

Output decimated video signals are provided to the time-shifting module 18. The p separate decimated video signals are provided to the time-shifting module 18 in parallel (i.e., at the same time). The time-shifting module 18 segments each of the p decimated video signals into consecutive video segments such that the start and end of each of the consecutive segments in consistent for each of the p video signals to maintain temporal corresponding segments. The time-shifting module 18 outputs the successive sets of p corresponding segments to the video compression module 22 in accordance with a first relative temporal order.

In one embodiment, the number of consecutive decimated frames in each segment of each successive set of p corresponding segments is fixed. In an alternative embodiment, the number of consecutive frames, nf, in two consecutive video segments of a given decimated video signal changes from a first number to a second number. The change from a first number of consecutive frames to a second number of consecutive frames also occurs for the corresponding segments of the other p−1 decimated video signals.

Note that the p parallel time-shifted decimated video signals output by the time-shifting module 18 may be created from a single input video signal rather than from four parallel signals output by the video-partitioning module 16. For example, the video video-partitioning module 16 may alternatively output video data to a memory or storage device (instead of directly to the time-shifting module 18). The resulting stored video data in the memory or storage device may include identification information identifying video lattices and segments thereof within the stored video data. The identification information may further specify the number of decimated frames in video segments, the temporal order of video segments in the respective p decimated video signals, and may further specify the temporal relationships between different video segments.

The input video signal to transmitter 12 may include a sequence of digitized uncompressed frames, including video frames that are mapped, via the video-partitioning module 16, with non-overlapping contiguous matrices containing n pixels each. For an embodiment in which p=n=4, each pixel of each mapped matrix is strategically assigned to a different one of the four parallel decimated video signals output by the video-partitioning module 16 and then processed by the time-shifting module 18. Each of the four parallel partitions gets one pixel from every mapped matrix in a given frame. Values of each distributed pixel to a partition may be altered from the corresponding pixel values of the input video signal by filtering capabilities in video-partitioning module 16.

Each decimated video signal is said to correspond to one or more partitions or lattices of the input video signal. Each frame includes sampling regions, the pixels of which are allocated to lattices, which are also called partitions. In the present embodiment, the sampling regions comprise locations corresponding to alternating pixels in the rows and columns of frames of the input video signal, which is input to the video-partitioning module 16.

In an alternative embodiment, a given stream (also called sub-stream), i.e., a given one of the p video signals output by the video-partitioning module 16, may include plural lattices or partitions of a given video frame. In this case, each frame of the input video signal (input to the video-partitioning module 16) is latticed into latticed frames, wherein plural latticed frames from a given input frame are allocated to a given stream. In this example, the number of streams (p) is less than the number of pixels (n) in a matrix.

In the embodiment where p=n=4 and where each frame is mapped with a two-dimensional grid of non-overlapping contiguous 2.times.2 matrices, a first decimated video signal of the four decimated video signals (streams) output by the video-partitioning module 16 includes one or more pixels located in upper left portion(s) of the set(s) of pixel locations corresponding to one or more mapped 2.times.2 matrices. A second decimated video signal includes one or more pixels located in upper right portion(s) of the set(s) of pixel locations corresponding to the mapped 2.times.2 matrices. A third decimated video signal includes one or more pixels located in lower left portion(s) of the set(s) of pixel locations corresponding to the mapped 2.times.2 matrices. A fourth decimated video signal includes one or more pixels located in lower right portion(s) of the set(s) of pixel locations corresponding to mapped 2.times.2 matrices. The particular mapping of 2.times.2 matrices are selectively repeated across each frame of the video signal so that each of the four decimated video signals include a different set of pixels chosen from every other pixel on every other line of each video frame of the input video signal.

Note that more or fewer than four pixels and four different lattices may be employed without departing from the scope of the present teachings. For example, the video-partitioning module 16 may partition the input video signal into two (instead of four) decimated video signals (streams), which are output in parallel to the time-shifting module 18.

Alternatively, the video-partitioning module 16 can identify different lattices of the input video signal and output a single uncompressed video signal to the time-shifting module 18 in response thereto. In this alternative implementation, the single uncompressed video signal output by the video-partitioning module 16 is complemented with auxiliary information that identifies the different lattices or partitions of the single uncompressed video signal. Exact details for implementing partitioning or latticing of an input video signal can be application specific.

For example, in an alternative implementation, the video-partitioning module 16 provides auxiliary information identifying the different lattices of the input video signal. The information identifying the different lattices enables the time-shifting module 18 to selectively change the temporal relationship between different segments of p video constituents (corresponding to the streams of other implementations discussed above) of the single stream output by the video-partitioning module 16. The p video constituents may be output by the time-shifting module 18 as individual streams. The auxiliary information identifying the different lattices may also facilitate enabling the receiver 14 to reconstruct a video signal from plural decoded video streams that have been time-shifted with respect to each other in accordance with a second relative temporal order, which has been skewed relative to a first temporal order, as discussed more fully below. The identification of different lattices via auxiliary information may be implemented via various mechanisms, such as by insertion of specific identifying packets; by selectively adding or altering packet headers at the transport stream level, the packetized elementary stream level, the coded video layer; or by other mechanisms. Alternatively, identification information is provided in data fields in: a transport stream's packet header or outside a packet payload. In another embodiment, the identification information is provided in data fields in a packetized elementary stream's packet header or outside the packet payload, wherein the packetized elementary stream is carried in the payloads of transport stream packets. In yet another embodiment, the identification information is provided in data fields in a packet header or outside a packet payload of a coded video layer.

Alternatively, identification information conveys the temporal relationship(s) between p non-corresponding video segments multiplexed and transmitted by the transmitter 12 over each successive transmission time interval, as discussed below with reference to FIG. 3a, wherein each of the p non-corresponding video segments respectively corresponds to a different video stream.

Those skilled in the art with access to the present teachings may readily implement video partitioning and de-partitioning to meet the needs of a given implementation without departing from the scope of the present teachings.

In one embodiment, the same sampling regions (used to obtain different lattices or partitions) are used by the video-partitioning module 16 for each successive frame of the input video signal. Each partition comprises pixels at the same spatial locations in every successive input frame, and the sampling regions are said to be two-dimensional sampling regions. Note that a sampling region represents a set of pixel locations, where the pixels at the locations in the set of pixel locations represent a lattice or partition. For this reason, a sampling region may also be called a sampling lattice.

In an alternative embodiment, the spatial locations of the pixels contributing to at least two partitions change from one frame to the next frame, and the sampling lattices are said to be three-dimensional sampling lattices. Three-dimensional sampling lattices are performed by the video partitioning module 16 by mapping a unique set of m two-dimensional sampling lattices to each successive set of t consecutive frames of the input video signal.

The plural corresponding decimated frames output and identified by the video-partitioning module 16 exhibit a first temporal relationship, also called a first relative temporal order, with respect to each other. As discussed above, plural corresponding decimated frames are said to be corresponding if they originated from the same frame in the input video signal. For the purposes of the present discussion, a temporal relationship between a decimated frame in a first partition that corresponds to a decimated frame in a second partition may include any time interval or set of time intervals separating the two corresponding decimated frames. For example, data used to construct a first input video frame, corresponding to a first segment, may be received by the video-partitioning module 16 during a first time interval, while data used to construct a second video frame, corresponding to a second segment, is received during a second time interval. The first time interval and the second time interval may be separated by a third time interval. The resulting decimated frames obtained from the first input video frame and the second input video frame and output by the video-partitioning module 18 may also be separated by the third time interval. A second relative temporal order (imparted by the time-shifting module 18) is characterized by a selectively skewed third time interval, as discussed more fully below.

An example first temporal relationship between frames of a video signal may be such that video frames occur in a data stream in separate groups of pixels that are grouped for transmission or reception in successive time intervals. An example second temporal relationship between frames of a video signal may be such that video frames or portions thereof (e.g., latticed frames thereof) occur in a data stream in separate groups of pixels that are grouped for transmission or reception in different time intervals than those used for the first temporal relationship.

In the above illustrative example, the first segment and the second segment correspond to individual video frames or video segments of plural video frames. In practice, when an input video signal with input frames is latticed, the first segment and the second segment include latticed frames corresponding to sampling regions of one or more video frames in the first segment and one or more video frames of the second segment of the input video frames, respectively. For the purposes of the present discussion, sampling regions of a video frame are also called spatial portions.

Note that any number (p) of partitions of the video signal input to the video-partitioning module 16 may be identified by the video-partitioning module 16. The video-partitioning module 16 may include instructions for separating an input video signal into plural data streams, where each data stream corresponds to one or more partitions, i.e., lattices derived from one or more corresponding sampling regions of the input video signal.

The time-shifting module 18 implements instructions for selectively changing the first temporal relationship such that video data associated with a given frame is output from the time-shifting module 18 at different time relative intervals than those characterizing corresponding video data output from the video-partitioning module 16. For example, the amount of time used to transmit data corresponding to a given frame in the video signal output by the video-partitioning module 16 is different than the amount of time used to transmit data from the same frame, after the time-shifting module 18 has processed the signal output by the video-partitioning module 16. This facilitates estimating lost data (such as data lost due to burst errors during transmission) to facilitate reconstructing video frames, as discussed more fully below.

For the purposes of the present discussion, a first segment of a video data stream is said to be time shifted relative to a second segment of the video data stream when a predetermined time interval is inserted between transmission of the first segment and the second segment of the video data stream. For example, in certain embodiments discussed herein, corresponding segments of video sub-streams are time shifted relative to each other to facilitate error concealment in a received video stream in the event of a loss of video data for a predetermined data-loss interval.

A video time-shifting module, such as the time-shifting module 18, may be any hardware and/or software device, collection of devices, or other entity that is adapted to move or rearrange in time different segments or other portions of a video. If the resulting time-shifted video were displayed before removal of the time-shifting, the display would be scrambled, as lattices of frames thereof would be received over a larger time span than ordinarily is allotted for receipt of a given frame. In the present specific embodiment, the time-shifting module 18 is adapted to identify the plural streams and segments thereof of the video data output from the video-partitioning module 16. The time-shifting module 18 is further adapted to time shift one or more of the plural segments of the different streams with respect to one or more other of the plural segments of the different streams by one or more predetermined time intervals.

In the present specific embodiment, the one or more predetermined time intervals are sized to enable estimation of lost data packets of a video data stream output by the encoder 20 for a predetermined data-loss interval larger than approximately 500 milliseconds and less than approximately 2 seconds. A data-loss interval may be any time interval during which data in a data stream exhibits errors, is lost, corrupted, or is otherwise not available. Various mechanisms may cause data loss in a communications channel or network, including burst errors, signal fades, or other data-loss mechanisms.

The four parallel time-shifted data streams output by the time-shifting module 18 are input to the encoder 20. Note that the parallel time-shifted data streams (p video signals) may have been filtered via an anti-aliasing filter implemented in the video-partitioning module 16. The anti-aliasing filter may be a lowpass filter or other type of filter designed to meet the anti-aliasing needs of a given implementation.

Parallel time-shifted data streams output by the time-shifting module 18 are input to the video-compression module 22 of the encoder 20. The video-compression module 22 may include instructions for compressing the four time-shifted data streams. Exact details of compression algorithms employed by the video-compression module 22 are application specific and in accordance with a video coding specification, such as ISO/IEC MPEG-2 Video (also known as ITU H.262) or ISO/IEC MPEG-4 Part 10 (also known as ITU H.264).

Note that in a packet switched network, a single data stream lacking sub-streams will generally include plural packets of information, where each packet may take a different path through the network 32 to arrive at a destination address. Accordingly, for transmission over a packet-switched network, a single data stream lacking sub-streams may be any data stream where individual packets have similar source and destination addresses. A data stream is said to have plural sub-streams transmitted in parallel when data of the data stream is transmitted simultaneously or approximately simultaneously from different source addresses and/or transmitted to different destination addresses. Note that the different source addresses and different destination addresses may correspond to a single device when the single device has multiple addresses associated therewith. For the purposes of the present discussion, a packet-switched network may be any collection of one or more communications links via which packets of information are routed via address information associated with the packets.

The video compression module 22 outputs four parallel time-shifted and compressed video data streams to the transmit chain 24. The transmit chain 24 includes various modules and functions used to prepare the compressed video data output by the video compression module 22 for transmission over the network 32. For example, the transmit chain 24 includes the FEC module 26, which applies forward error correction to each of the sub-streams output by the video-compression module 22.

FEC involves adding redundant data to a data stream to reduce or eliminate the need to retransmit data in the event of certain types of data loss. The redundant data facilitates reconstructing the data stream at the receiver in the event of data loss. The FEC module 26 adds sufficient redundant data to each sub-stream output by the video-compression module 22 to enable the receivers 14, 30 to correct for errors or data loss to each video sub-stream within an FEC-protection time interval, also called and FEC protect window. Generally, the FEC-protection time interval is often relatively small compared to a loss-concealment interval implemented by the LCALCs 44, 54, as discussed more fully below.

Exact details of the transmit chain 24 are application specific. For example, when transmitting over a packet-switched network, such as the Internet, the transmit chain 24 may include a router and a firewall coupled to an Internet Service Provider, and so on. When transmitting over a wireless network, the transmit chain 24 may include a baseband-to-IF (Intermediate Frequency) converter, automatic gain control, filters, upconverters, a digital-to-analog converter, duplexer, antenna, and so on.

In the present specific embodiment, the transmit chain 24 transmits four data streams over the network 32. In other embodiments different numbers of streams may be used.

The network 32 may be implemented via a packet-switched network, circuit-switched network, wireless network, etc. Alternatively, the network 32 may be replaced with a direct communications link between the transmitter 12 and the receivers 14, 30. In wireless applications, the four data streams may be transmitted to the receivers 14, 30 via four different communications channels or frequency bands.

The first receiver 14 receives or otherwise subscribes to all four data streams transmitted by the transmit chain 24 via the network 32. In wireless implementations, the first receive chain 36 may include one or more amplifiers, frequency downconverters, filters, automatic gain control circuits, IF-to-baseband converters, analog-to-digital converters, and so on. In packet-switched network applications, the receive chain 36 or 46 may include one or more routers or other network hardware to facilitate connecting the receiver 14 to the network 32. Exact details of the first receive chain 36 are application specific. Those skilled in the art with access to the present teachings may readily determine and implement a suitable receive chain to meet the needs of a given application without undue experimentation.

In the present embodiment, the first receive chain 36 includes a reverse FEC module 38. The reverse FEC module 38 implements instructions for repairing certain data loss or corruption occurring in one or more of the four data streams received from the transmit chain 24. The certain data loss or corruption corresponds to data losses or corruption that are within a predetermined data-loss interval, called the FEC protect window. Existing FEC modules, methods, and techniques may be readily adapted for use with embodiments discussed herein by those skilled in the art without undue experimentation. The first reverse FEC module 38 is further adapted to undue any modifications to the parallel data streams that were initially performed by the FEC module 26 of the transmit chain 24 before the parallel data streams were transmitted over the network 32.

The first video-decompression module 40 includes one or more circuits, routines, or instructions for decompressing the data streams that were compressed by the video-compression module 22. The instructions may include an inverse of the process used by the video-compression module 22 to initially compress the data streams.

Decompressed video data streams are then output by the video-decompression module 40 and subsequently de-partitioned by the first video-de-partitioning module 42. The first video-de-partitioning module 42 includes instructions for removing any time shifting between video data streams that have been applied via the time-shifting module 18 and for combining the data streams into a desired format in preparation for input to LACL1 44.

Exact details of mechanisms for removing time-shifting and combining data streams are application specific. Various suitable methods may be employed. For example, parallel video data streams may include tags or packet headers that identify how the video data streams should be reconstructed. This identification information, which may be added by the video partitioning module 16 and time-shifting module 18, may enable the video-de-partitioning module 42 to recombine the data streams and remove time-shifting based on the tags or packet headers. The exact choice and implementation of the identification information is application specific and may depend on the choice of data format. For example, MPEG-2 (Moving Picture Experts Group-2) formatted video may employ a program map or association table, which can include packet-identification information to distinguish the p streams and to enable a receiver, such as the receiver 14 of FIG. 1, to undo the time shifting and video partitioning performed by the time-shifting module 18 and the video-partitioning module 16.

The first loss-concealment and latency-compensation module 44 includes instructions for concealing any losses in the data that were not repaired by the reverse FEC module 38. Furthermore, since different partitions or lattices (portions) of the original or input video signal input to the video-partitioning module 16 were placed in separate data streams and time shifted with respect to each other, a time interval, called a latency interval, may occur at the receivers 14, 30. This latency interval represents, for example, a time interval occurring before all portions of a set of initial video frames arrive at the loss-concealment and latency-compensation module 44. During this initial latency interval, while the loss-concealment and latency-compensation module 44 waits for receipt of all portions of the initial data frames, the loss-concealment and latency-compensation module 44 conceals the missing information that has not yet been received.

The number of initial frames, for example, after a channel is changed on a television or set-top terminal, that will have missing data depends on the amount of time-shift applied to each data stream by the time-shifting module 18 and the sizes of the segments (e.g., 2-second segments) in which the input video signal has been divided by the video-partitioning module 16. For example, if a three-second interval occurs between transmission of a first segment of a first data stream and transmission of a corresponding first segment of a fourth data stream, then approximately three-seconds worth of initial frames will be received by the LACL1 44 before latency-compensation is no longer needed for the video. The output of the LACL1 44 may be input to another stage of video processing, to a display device, to memory, or to another entity.

Various methods for concealing missing or lost information may be employed by the loss-concealment and latency-compensation module 44. For example, in one implementation, missing pixel information is estimated via an interpolation process. The interpolation process may include performing linear or nonlinear interpolation in a direction across a video frame that exhibits the least amount of change in color brightness, and/or combination thereof. Providing missing or corrupted pixel information is a type of upsampling. Accordingly, the upsampling of missing or corrupted pixels may be performed by filling in pixels in the direction of decreasing luma and/or chroma gradients using nonlinear upsampling.

Interpolation may include determining how certain information varies across a video display and then continuing or interpolating the pattern to fill in missing pixels. Various types of interpolation are possible. Details for determining values for missing pixel information can be application specific. Those skilled in the art with access to the present teachings may readily implement different embodiments of the invention. For example, any suitable concealment algorithm can be used to estimate or derive missing pixels.

Furthermore, while the LACL1 44 generally employs pixel information associated with a given frame to estimate lost pixel information within the frame, embodiments are not limited thereto. For example, in certain implementations, pixel information from adjacent frames may be employed to further estimate lost pixel information in a given frame. Furthermore, loss-concealment techniques may further include employing motion information, such as via motion vectors, to estimate lost pixel information.

The second receiver 30 operates similarly to the first receiver 14 with the exception that the second receiver 30 subscribes to only a subset of the parallel data streams transmitted by the transmit chain 24. In this case, the second loss-concealment and latency-compensation module 54 conceals data corresponding to the missing data stream. In the present embodiment, this would correspond to one pixel for each predetermined group of four (in the specific case where p=4) adjacent pixels in each video data frame.

Note that embodiments discussed herein are not limited to a particular video format. Different video formats may employ different encoders and decoders. Furthermore, embodiments are not limited to video data transmission, as similar concepts discussed herein may be employed for robust transport of audio data or other types of data. Those skilled in the art with access to the present teachings may readily modify the modules of the system 10 to meet the needs of a given implementation without undue experimentation.

In the present specific embodiment, each pixel in a video frame includes a luma component (Y'), a chroma-blue component (Cb), and a chroma-red component (Cr). The Y' component contains brightness information, while the chroma components Cb and Cr contain color information.

Certain video formats, such as MPEG-2 use chroma subsampling. Chroma subsampling involves allocating more resolution and associated bandwidth to luma components than chroma components, since human visual perception is less sensitive to chroma information than it is to brightness information, i.e., luma or luminance information.

In certain applications using video formats employing chroma subsampling, chroma information for a given video frame may be sent separately from luma information. Hence, a given frame may be sent as separate sub-frames, where the chroma sub-frames are smaller than the luma sub-frames by a factor determined by a subsampling ratio employed when formatting the video.

Hence, a given video frame may be transmitted in separate sub-frames, where each separate sub-frame contains a component of the combined frame. In such applications, the separate sub-frames may be shuffled in time and transmitted in accordance with an embodiment discussed herein. If, for example, portions of a luma frame are lost due to a large signal fade or interference larger than the FEC protect window, and the corresponding chroma sub-frames are not lost, the LCALCs 44, 54 may readily estimate the lost pixels of the luma sub-frames. The resulting estimated picture may represent a relatively accurate visual depiction of the original or input video frame, as the existing chroma information may facilitate disguising the lost luma information. Hence, if components of any sub-frames are lost, the remaining sub-frames may facilitate disguising or concealing missing pixel information. Note that video formats not employing chroma subsampling and not employing sub-frames may be employed without departing from the scope of the present teachings.

While the embodiment of FIG. 1 has been primarily discussed with respect to processing of a video signal comprising a sequence of video frames, embodiments are not limited thereto. For example, an audio signal or other media signal having an output order of its samples or elements may be separated into different partitions in accordance with the present teachings, where the different partitions of the audio or media signal are processed and shuffled in time and optionally transmitted via different parallel data streams before they are recombined at a receiver.

FIG. 2 is a diagram illustrating a first example partitioning of a video frame 60 by the system 10 of FIG. 1. The frame 60 includes rows and columns of pixels, where the location of the pixel in the i-th row and j-th column is denoted ij. Each pixel ij in the frame 60 is associated with a given sampling region, also called sampling lattice, which is associated with a partition, to be processed and transmitted as a separate corresponding video stream. Each video stream corresponds to a distinct lattice or partition. In one embodiment, the plural separate video streams are multiplexed and transported over a single transport stream over a single transmission channel. In an alternative embodiment, the plural video streams are multiplexed in a single video stream with auxiliary information that identifies the respective partitions within the video stream. The respective partitions are shuffled within the video stream according to a first relative temporal order such that the corresponding frames in different partitions are transmitted at strategically different times to facilitate error concealment.

In the present embodiment, the video frame 60 is logically partitioned by mapping non-overlapping contiguous 2.times.2 matrices on the frame 60, where each pixel from each 2.times.2 matrix is assigned to a respective partition, i.e., lattice. For example a first group of pixels in the top-left matrix includes pixels 00, 01, 10, and 11. Pixel 00 is assigned to a first partition, V0. Pixel 01 is assigned to a second partition, V1. Pixel 10 is assigned to a third partition, V2, and pixel 11 is assigned to a fourth partition, V3. Note that the different partitions V0-V3 represent data sent via respective streams S0-S3.

Hence, the partition V0 is assigned every other pixel on every other row starting with pixel 00, i.e., V0 is assigned pixels mn, where m and n are even integers. V1 is assigned pixels mw, where m is an even integer, and w is an odd integer. V2 is assigned pixels qn, where q is an odd integer, and n is an even integer. Similarly, V3 is assigned pixels qw, where q and w are odd integers. Consequently, each 2.times.2 matrix contains four pixels that are each assigned to one of four different lattices. Note that in FIG. 2, pixels labeled V0 represent a zeroth latticed frame (LV0); pixels labeled V1 represent a first latticed frame (LV1); pixels labeled V2 represent a second latticed frame (LV2), and pixels labeled V3 represent a third latticed frame (LV3). When referring to a collection of frames in a video signal, pixels labeled V0-V1 represent partitions or lattices of a video signal comprising the collection of frames, and such lattices are sent via corresponding video data streams S0-S3, as discussed more fully below.

Figure 3A:
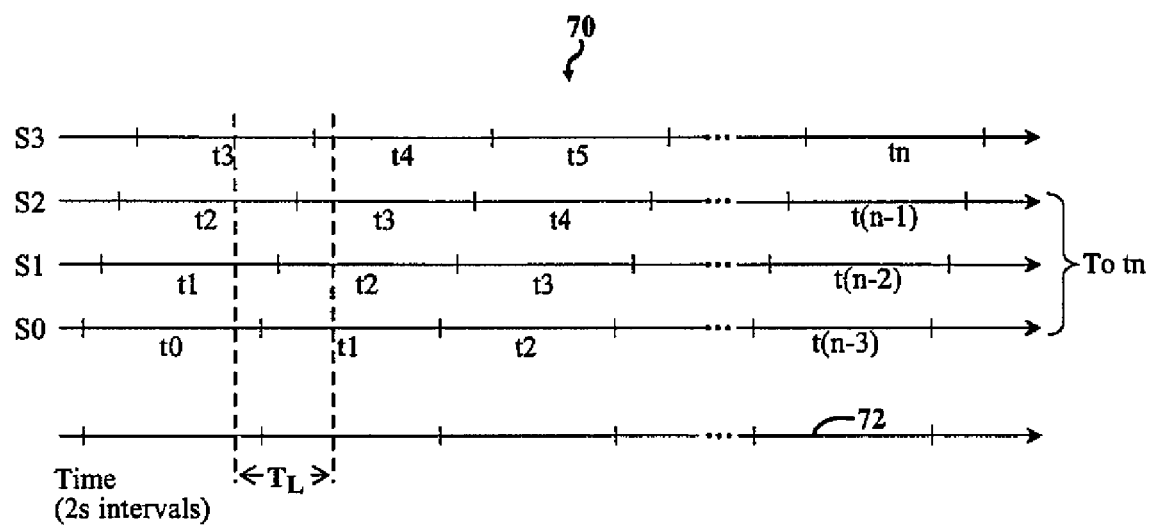
FIG. 3a is a first example timing diagram illustrating parallel transmission of time-shifted video streams and an example data-loss interval, where each stream corresponds to a partition or lattice of a video signal processed by the example communications system of FIG. 1.

FIG. 3a is a first example timing diagram 70 (with p=4) illustrating transmission of time-shifted video streams S0-S3, which correspond respectively to the compressed versions of video partitions V0-V3 by the example communications system 10 of FIG. 1. Interval T.sub.L is an example of a data loss occurrence. The timing diagram 70 includes a horizontal time axis 72. In an alternate embodiment, T.sub.L or any interval on the horizontal axis 72 may represent an interval of multiplexed portions of S0-S3, such as when respectively corresponding portions of S0-S3 are multiplexed over an interval in a transport stream. In one embodiment, corresponding portions of S0-S3 may be multiplexed over an interval in a video stream. An interval may be perceived in FIG. 3a as a vertical slice through S0-S3. For a stream carrying multiplexed portions of S0-S3, a particular interval may be at a corresponding location of the stream and have a corresponding width. A particular interval may have a corresponding starting time and a corresponding duration. In one embodiment, a particular interval contains at most one provided portion from each of the streams S0-S3 and each respective provided portion in the particular interval is from at most one compressed picture.

In one embodiment, a portion of a compressed picture of a video stream (e.g., S0) may be provided over an interval while providing one or more portions from the other remaining streams (e.g., S1-S3), where each of the one or more provided portions corresponds to: (1) at most one compressed picture, and (2) at most one stream from S1-S3. Four simultaneously provided compressed pictures over a first interval, or their respective corresponding provided portions, may be respectively associated with a different temporal or display time of the input video signal (i.e., the four pictures are non-corresponding or non-associated pictures since they did not originate from the same picture of the input video signal). Two or more provided compressed pictures over a second interval, or their respective corresponding provided portions, may be corresponding or associated pictures (i.e., they are corresponding or associated pictures since they originated from the same picture of the input video signal).

Various video segments (t0-t5) are labeled in FIG. 3a based on the temporal progression of each video stream S0-S3. Video segments are labeled in accordance with the temporal progression of successive segments of pictures of the input video signal to the transmitter 12 of FIG. 1. A given segment, such as t1, represents corresponding compressed video frames, i.e., processed decimated video frames that originated from the same segment of frames of the input video signal to the system 10 of FIG. 1. As described previously, a video segment comprises nf consecutive compressed video frames in each of the video streams S0-S3. Note that the corresponding compressed segments, or corresponding pictures in each segment, have a common display or output time. In FIG. 3a, a set of corresponding video segments is depicted by all of the instances of tk, where: k is an integer. The labels tk demarcate segments corresponding to time intervals in the temporal progression of each video stream, and each instance of tk represents a corresponding set of nf compressed video frames of a video segment, where nf can have a value equal or greater than one. For example, the time intervals labeled t1 in the temporal progressions of video streams S0-S3 pertain to corresponding video segments, each with nf compressed video frames.

In the present embodiment, each video stream S0-S3 is shifted in time relative to the other video streams S0-S3 as shown in FIG. 3a. In this example embodiment, the segments t0-t5 are approximately two seconds long, and successive segments are offset or skewed with respect to each other, for example, by approximately 200 milliseconds, which corresponds to the FEC protect window employed by the FEC module 26 of FIG. 1.

With reference FIGS. 1 and 2, if the frame 60 shown in FIG. 2 occurs within a certain time interval t3 of its corresponding picture in the input video signal to transmitter 12 of FIG. 1, the frame 60 is said to occur within the set of corresponding video segments associated with the t3 time interval, or herein the t3 segment of video or t3 segment. However, with reference to FIG. 3a, V0-V3 lattices corresponding to the set of t3 corresponding segments are transmitted time-shifted or delayed as shown by the staggering of t3 in FIG. 3a. In one embodiment, the exact delay between successive t3 segments is slightly less than t3, and is approximately t3 minus the 200 millisecond FEC protect interval window. This delay may be according to the number of frames, nf, in segment t3, such that the delay represents an integral number of frame transmission intervals, where a frame transmission interval represents the time used to transmit a single frame.

Over a transmission time interval that can be depicted as a vertical slice in FIG. 3a that spans four segments (e.g., t0-t3), four (p=4) non-corresponding segments (where non-corresponding segments are assigned different labels, e.g., t0-t3), one being a t3 segment, may be, in an alternative implementation, multiplexed onto a single transport stream and then transmitted by transmitter 12 as opposed to being transmitted via multiple streams. Transmitter 12 may provide over a particular interval a portion of a single picture from stream S0 while providing a corresponding portion of a single picture from one of the remaining streams, S1-S3. Transmitter 12 may provide over an interval multiplexed portions of S0-S3 such that at most one portion from each of the streams S0-S3 is provided, and such that each provided portion in the interval is from at most one compressed picture.

The receiver 14 of FIG. 1 will wait to receive the t3 segments from the data streams S0-S3 before a given frame is considered complete. Before all t3 segments for each data stream S0-S3 are received for a given frame, the LCALC1 44 of FIG. 1 may interpolate to estimate pixel information that has not yet arrived.

After an initial latency period, subsequent frames will have already arrived for the next frame so that display or output of subsequent frames will not require latency compensation. This is called a pipelining effect, where successive video segments are sent back to back. Note that the various video segments t0-t3 are sent pipelined and in parallel. Note that overlap occurs during successive transmission of the segments t0-t3 for different data streams S0-S3.

The video data streams S0-S3 are said to be time-shifted with respect to each other, since the different video segments t0-t3 for different data streams S0-S3 are transmitted at different times, i.e., at shifted times, rather than at similar times.

Figure 3B:
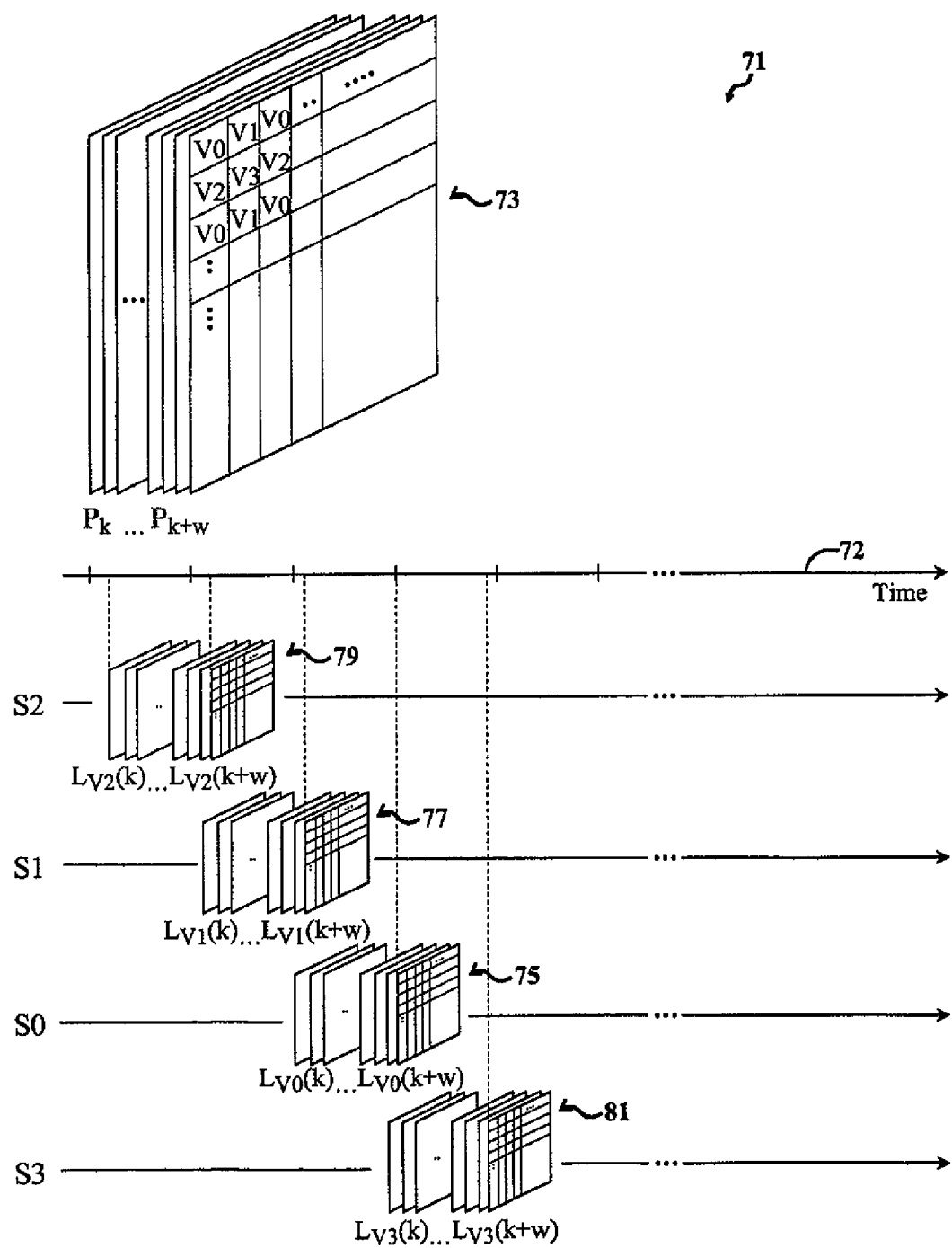

FIG. 3b is a second example timing diagram 71 illustrating example transmission timing of video data from a group of video frames (P.sub.k . . . P.sub.k+w) 73 corresponding to the segments t2 of FIG. 3a. In the present example, the group of video frames 73 includes w frames, including a kth frame (P.sub.k) and a (k+w)th frame (P.sub.k+w) Note that in the present example, w frames is equivalent to 2 seconds worth of frames. However, note that differently sized segments may be used. For example, in an alternative implementation where w=1, each of the segments t0 ... t5 of FIG. 3a represent a time interval needed to transmit one frame worth of data. Generally, in the embodiments discussed herein, the temporal widths of the segments t0 ... t5 of FIG. 3a are chosen to correspond to an integral number of frames.

The initial input group of video frames 73 are partitioned into lattices, including a zeroth group of latticed frames (LV0 (k) ... LV0(k+w)) 75, a first group of latticed frames (LV1(k) ... LV1(k+w)) 77, a second group of latticed frames (LV2(k) ... LV2(k+w)) 79, and a third group of latticed frames (LV3(k) ... LV3(k+w)) 81. The latticed frames LV0 ... LV3 are also called decimated or down-sampled frames and include pixels labeled V0-V3, respectively. The latticed frames LV0 ... LV3 are transmitted via data streams S0-S3, respectively, at strategically staggered time intervals. Alternatively, the data streams S0-S3 are multiplexed onto a single transport stream, which may include additional information, such as audio synchronization information, closed caption information, and so on. Close-caption information may be included for each respective decimated or sub-stream version of the video stream, albeit redundant. Exact details for implementing transport streams for a given application may be readily determined by those skilled in the art. For illustrative purposes, the segments in FIG. 3b are shown corresponding to the t2 segments of FIG. 3a.

Hence, one example embodiment involves transmitting different lattices of one or more video frames via different data streams via selectively staggered time intervals (segments), where each latticed frame is chosen by selecting one pixel from each matrix of the frame. In other words, video frames are partitioned into latticed frames; each latticed frame is assigned to a different data stream; then transmission of the different latticed frames is selectively staggered in time. The staggering may be chosen based on characteristics of a given transmission medium, such as the types and durations of burst errors to which the transmission medium is prone.

Figure 4:
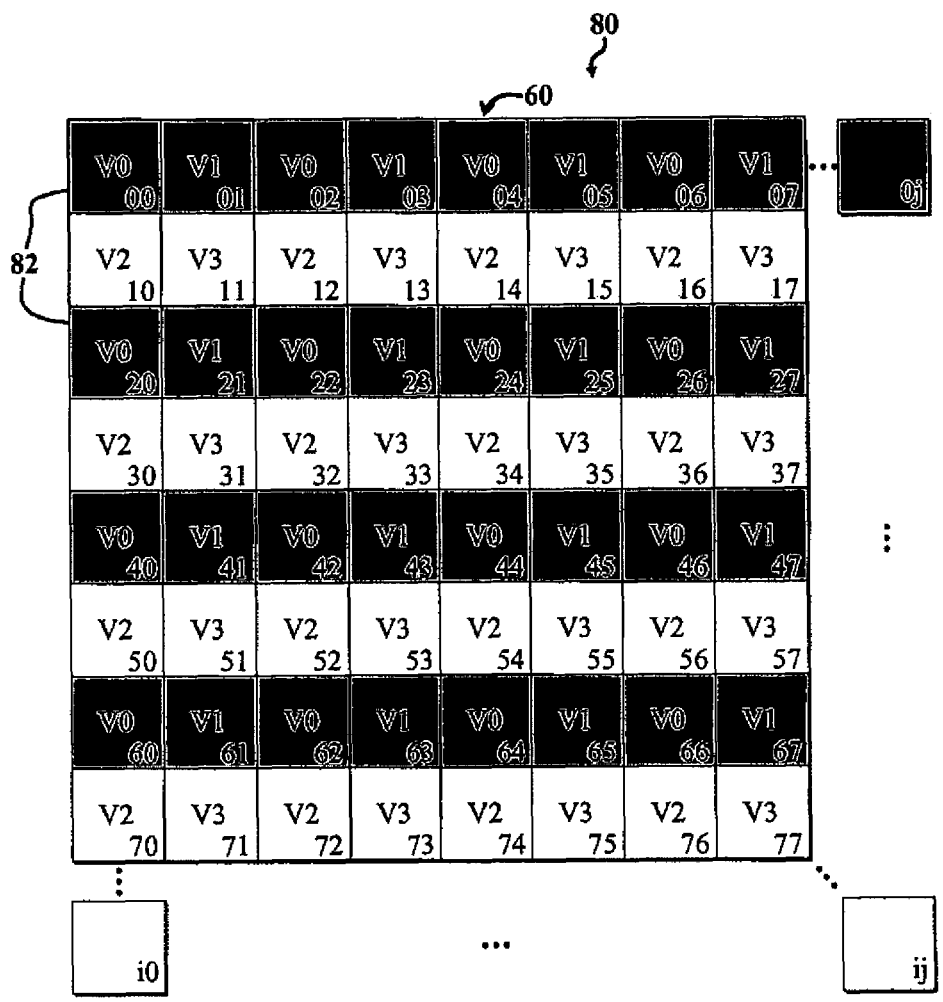
FIG. 4 is diagram of the example video frame of FIG. 2 showing an example data-loss pattern for the data-loss interval of FIG. 3a for a first video segment (t1).

FIG. 4 is diagram of the example video frame of FIG. 2 showing a first example data-loss pattern 80 for the data-loss interval T.sub.L of FIG. 3a corresponding to the first video segment t1.

With reference to FIGS. 3 and 4, for illustrative purposes, the frame 60 is assumed to have lost, during the data-loss interval T.sub.L of FIG. 3, portions of the zeroth data stream S0 and the first data stream S1 occurring in the video segment t1. Note that for the video segment t1, only data from data streams S0 and S1 are lost, i.e., occur within the data-loss interval T.sub.L. Consequently, the frame 60 will only lose a portion of the pixels during the relatively large data-loss interval T.sub.L, which may be larger than 500 milliseconds, and is approximately two seconds in the present example. Component values for the lost pixels may be interpolated or otherwise estimated, thereby avoiding a black-screen effect that might otherwise occur for such a large data-loss interval.

As shown in FIG. 4 pixel information for pixels labeled V0 and V1 and corresponding to the data streams S0 and S1, respectively, are lost for the video segment t1 during the large data-loss interval T.sub.L. The loss pattern 80 includes horizontal bands 82 of lost pixels.

Figure 5:
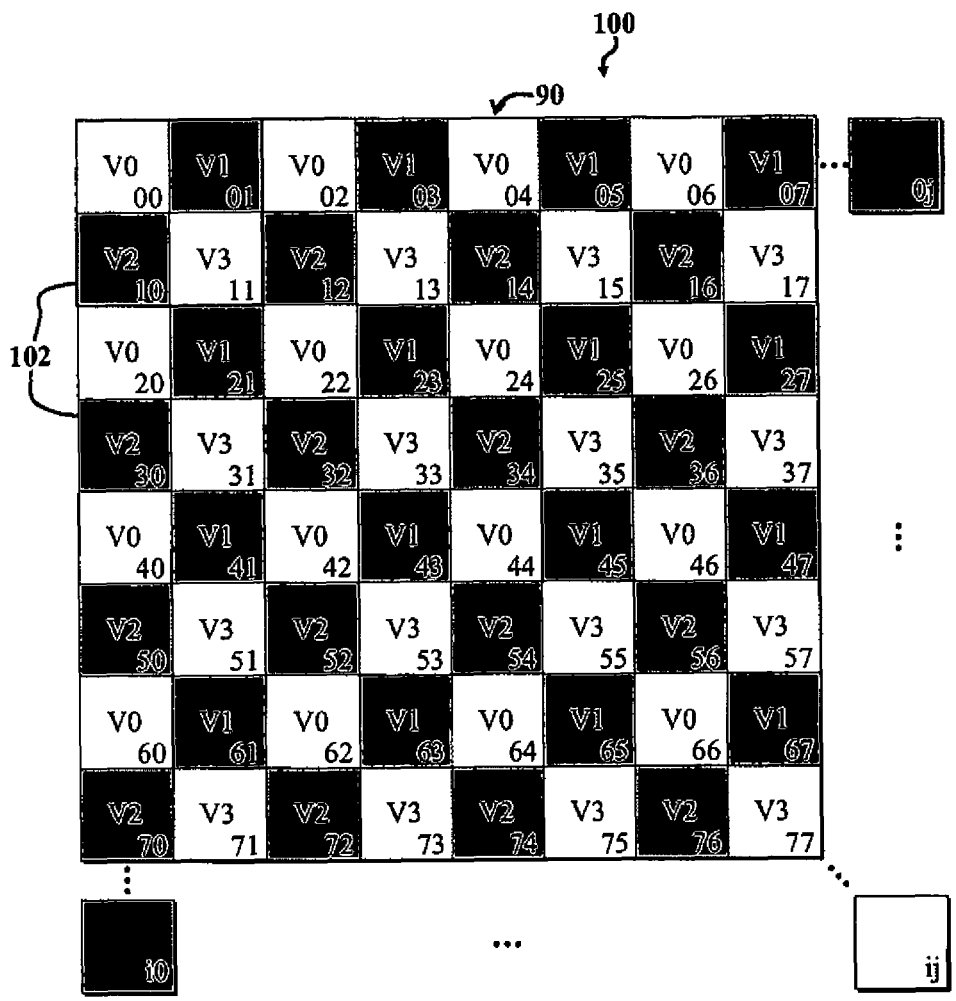
FIG. 5 is diagram of a second example video frame partitioned in accordance with the video partitioning illustrated in FIG. 2 and showing an example data-loss pattern for the data-loss interval of FIG. 3a for a second video segment (t2).

FIG. 5 is diagram of a second example video frame 90 partitioned in accordance with the video partitioning illustrated in FIG. 2 and showing a second example data-loss pattern 100 for the data-loss interval T.sub.L of FIG. 3a for the segment t2.

With reference to FIGS. 3 and 5, the second example video frame 90 represents a video frame associated with the second video segment t2, which illustrates portions of data streams S1 and S2 that are lost during the data-loss interval T.sub.L shown in FIG. 3. Note that in FIG. 3, the video segment t2 occurs in the streams S1 and S2 during the data-loss interval T.sub.L, and corresponding portions (pixels labeled V1 and V2) of the streams S1 and S2 are considered lost for the purposes of the present example.

Accordingly, pixels associated with data streams S1 and S2 are shown missing in FIG. 5, forming diagonal bands 102 of lost pixels.

Figure 6:
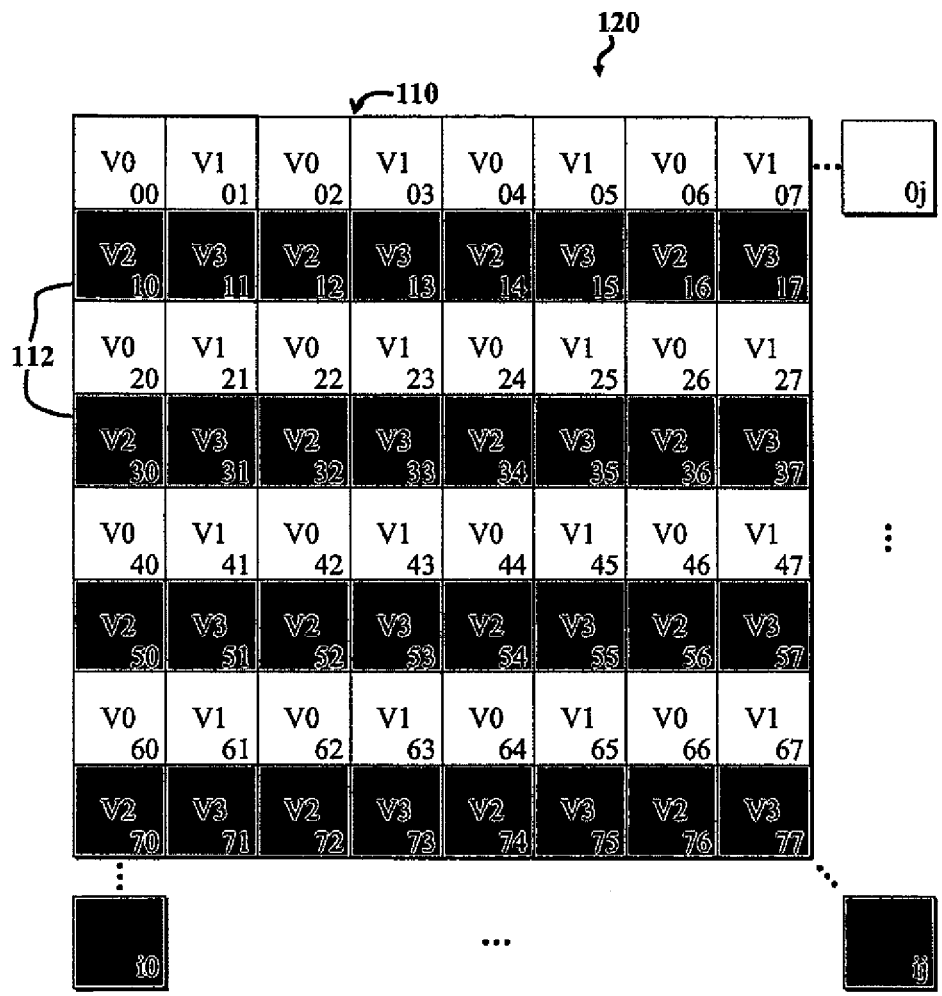
FIG. 6 is diagram of a third example video frame partitioned in accordance with the video partitioning illustrated in FIG. 2 and showing an example data loss pattern for the data-loss interval of FIG. 3a for a third video segment (t3).

FIG. 6 is diagram of a third example video frame 110 partitioned in accordance with the video partitioning illustrated in FIG. 2 and showing a third example data loss pattern 120 for the data-loss interval T.sub.L of FIG. 3a for a third video segment t3.

With reference to FIGS. 3 and 6, data loss corresponding to the data-loss interval T.sub.L affects the third the third video segment t3 of the second data stream S2 and the third data stream S3. Accordingly, the third data-loss pattern 120 includes horizontal bands 112 of missing or corrupted pixels corresponding to the pixels labeled V2 and V3, which correspond to the data streams S2 and S3.

Note that the receivers 14, 30 of FIG. 1 are adapted to selectively combine the video data streams S0-S3 and to synchronize or temporally align the streams so that the various segments t0-t5 of each data stream approximately temporally coincide in preparation for display or output. For example, the t2 segment components of the data streams S0-S3 may approximately coincide with each other after processing by the receivers 14, 30, thereby facilitating reconstructing and displaying the video frame or frames associated with the segment or time interval identified by t2.

Note that the video-data loss corresponding to the data-loss interval T.sub.L of FIG. 3a is spread over five intervals or video segments t0-t4. The five intervals may represent five frames in implementations where one frame is allocated for each interval t0-t4. The five intervals or frames include the frames 60, 90, 110 of FIGS. 4-6 for the video segments t1-t3.

While six video segments t0-t5 are shown in FIG. 3, embodiments are not limited thereto. For example, the data streams S0-S3 may be partitioned into more or fewer than six segments. Furthermore, the segments t0-t5 may be shuffled so that the segments occur in a different order or timing than shown in FIG. 3.

Note that losses that occur in successive time intervals or video segments t0-t3 occur in different patterns, thereby facilitating disguising losses. For example, after predetermined time interval, the data loss pattern changes. If the loss patterns shown in FIGS. 4-6 are successively displayed, the resulting data loss may be more difficult to perceive than if a single data-loss pattern remained during all time intervals.

FIG. 7 is a diagram illustrating a second example partitioning of a fourth video frame 130 by the system 10 of FIG. 1. The fourth video frame 130 is logically partitioned into groups, i.e., matrices, of four linearly disposed adjacent pixels, where each pixel, labeled V0-V3, from a 1.times.4 matrix of pixels is assigned a different video-data stream S0-S3, respectively. The fourth video frame 130 is considered logically partitioned into matrices of four pixels, since in practice, the system 10 need not actually separate or partition a frame into the matrices. Instead, the system 10 of FIG. 1 may merely assign certain pixels to different data streams based on a predetermined methodology without physically or electronically grouping or separating the pixels in 1.times.4 matrices as shown in FIG. 7.

For example, pixels 00, 01, 02, and 03 form a first matrix of pixels, where pixel 00 is assigned to data stream S0; 01 to data stream S1; 02 to data stream S2; 03 to data stream S3. The pixel-grouping pattern, i.e., matrix pattern, repeats as shown in FIG. 7. In general, pixels for data streams S0 and S2 are selected from alternating pixels in every other column of the video frame 130. Pixels for data streams S1 and S3 are also selected from alternating pixels in every other column. This grouping of pixels ensures that for a given loss interval, such as the data-loss interval T.sub.L of FIG. 3, that for any frame that is missing two data streams, the resulting lost pixels will not occupy an entire line or column. This may ensure that the data losses will be less perceptible to the human eye than they would be if entire lines or columns of pixels were lost. This is based on the notion that human perception is more sensitive data loss occurring along to horizontal or vertical lines than along diagonal lines.

With reference to FIGS. 2, 3a, and 7 the logical partitioning of the frame 130 of FIG. 7 into 1.times.4 adjacent matrices four pixels results in different pixel assignments to different data streams than results from the partitioning shown in FIG. 2. Consequently, the corresponding data loss patterns for the example data-loss interval T.sub.L of FIG. 3a will be different than the corresponding data-loss patterns 80, 100, 120 of FIGS. 4-6.

Figure 8:
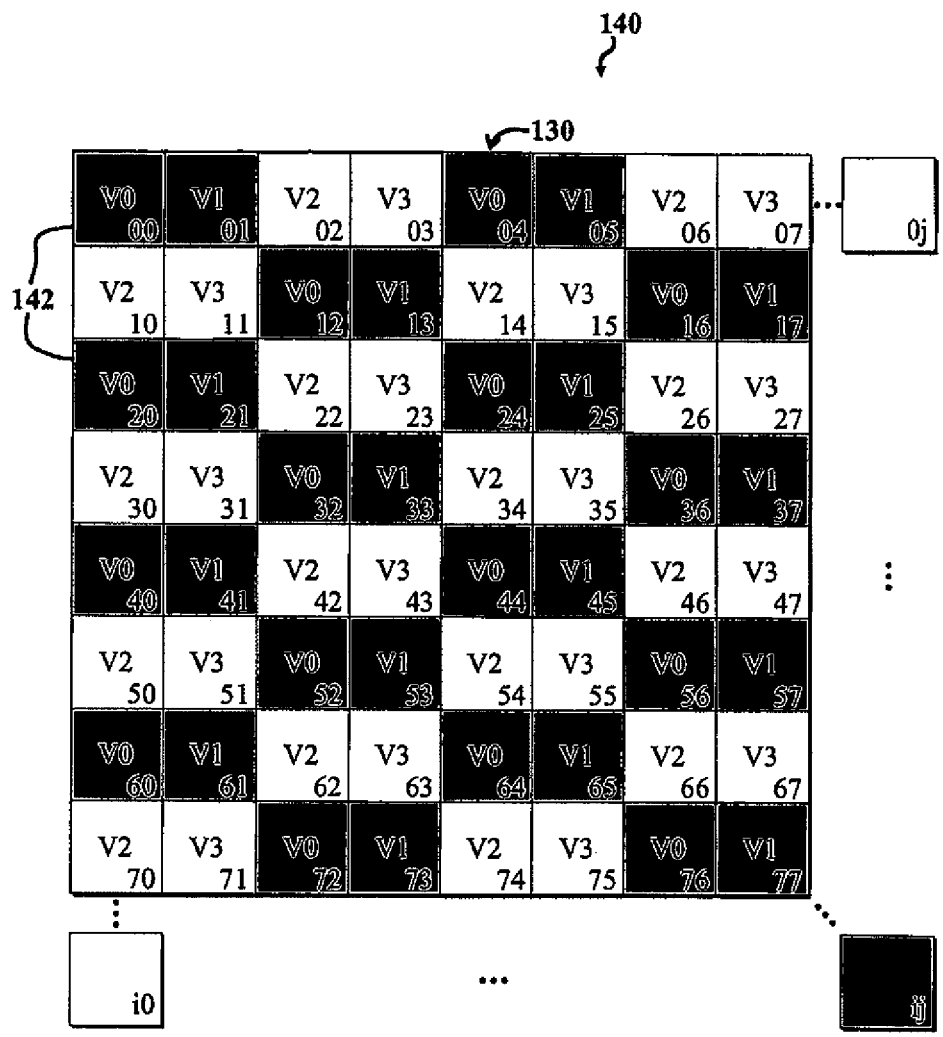
FIG. 8 is diagram of the example video frame of FIG. 7 showing an example data-loss pattern for the data-loss interval of FIG. 3a for a first video segment.

FIG. 8 is diagram of the fourth example video frame 130 of FIG. 7 showing a fourth example data-loss pattern 140 for the data-loss interval T.sub.L of FIG. 3a for the first video segment t1.

With reference to FIGS. 3 and 8, data in FIG. 8 is lost from data streams S0 and S1 for the first video segment t1. Accordingly, for illustrative purposes, pixels (labeled V0 and V1) corresponding to data streams S0 and S1 are marked in FIG. 8 as having been lost. The resulting loss pattern 140 includes alternating groups of two pixels 142, which form so-called horizontally biased paired diagonal loss.

Figure 9:
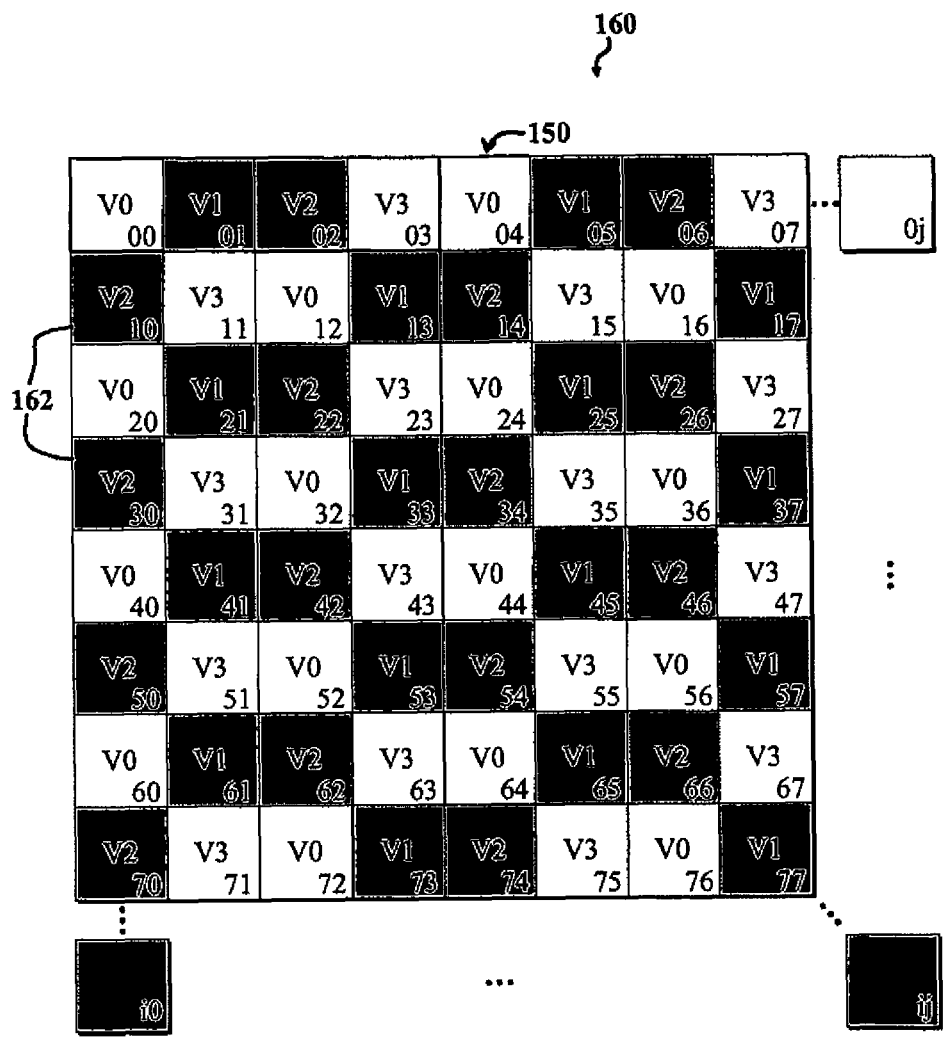
FIG. 9 is diagram of the example video frame partitioned in accordance with the video partitioning illustrated in FIG. 7 and showing an example data-loss pattern for the data-loss interval of FIG. 3a for a second video segment.

FIG. 9 is diagram of a fifth example video frame 150 partitioned in accordance with the video partitioning illustrated in FIG. 7 and showing a fifth example data-loss pattern for the data-loss interval T.sub.L of FIG. 3a for the second video segment t2.

With reference to FIGS. 3a and 9, data is lost from data streams S1 and S2 for the second video segment t2 during the data-loss interval T.sub.L of FIG. 3a. This yields the fifth data-loss pattern 160, which includes missing pixels for the data streams S1 and S2. The resulting loss pattern 160 includes alternating pairs of missing or corrupted pixels 162 (labeled V1 and V2), which form horizontally biased paired diagonal loss.

FIG. 10 is diagram of a sixth example video frame 170 partitioned in accordance with the video partitioning illustrated in FIG. 7 and showing a sixth example data-loss pattern 180 for the data-loss interval T.sub.L of FIG. 3a for the third video segment t3.

With reference to FIGS. 3a and 10, data is lost from data streams S2 and S3 for the third video segment t3 during the data-loss interval T.sub.L of FIG. 3a. This results in the sixth data-loss pattern 180, which includes the horizontally biased paired diagonal loss of pixels 182 (labeled V2 and V3).

FIG. 11 is a diagram illustrating a third example partitioning of a seventh video frame 190 by the system 10 of FIG. 1. The seventh video frame 190 is logically partitioned into 2.times.2-pixel groups of four pixels. Groupings, i.e., matrices of pixels labeled V0-V3, as shown in FIGS. 11 and 12 are similar to those shown in FIG. 2 with the exception that matrices on adjacent pairs of rows are offset by one pixel.

Figure 12:
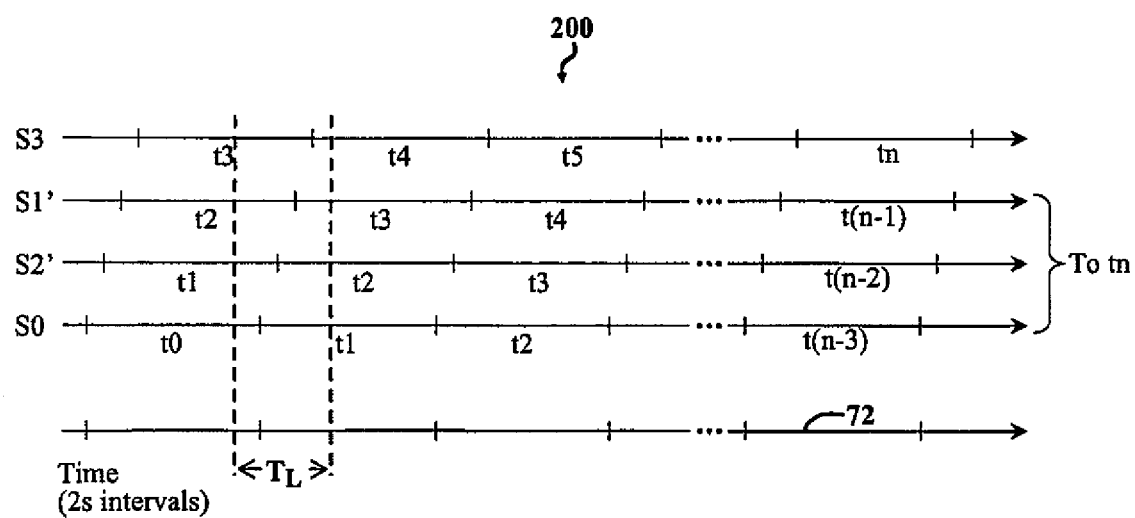
FIG. 12 is a third example timing diagram illustrating parallel transmission of time-shifted video streams and an example data-loss interval, where each stream corresponds to a partition or lattice of the video signal in the example communications system of FIG. 1.

FIG. 12 is a third example timing diagram illustrating parallel transmission of time-shifted video data streams S0, S1', S2', and S3 and an example data-loss interval T.sub.L, where each stream S0, S1', S2', and S3 corresponds to a partition or lattice of the video in the example communications system 10 of FIG. 1.

The third example timing diagram 200 is similar to the first example timing diagram 70 of FIG. 3a with the exception that the first video data stream S1' of FIG. 12 is segmented (via positioning of t0-t5) similarly to S2 of FIG. 3, and S2' of FIG. 11 is segmented similarly to S1 of FIG. 3.

Note that the way a given video data stream is segmented may be defined relative to the other video data streams. For example, video segments t0-t5 for the different data streams S0, S1', S2', and S3 may be transmitted with predetermined temporal relationships. In FIG. 12, this temporal relationship is partially described by a time offset of approximately 1800 milliseconds between occurrences of the corresponding video segment component in an adjacent video data stream. For example, the video segment component t2 of the data stream V2' begins approximately 1800 milliseconds after the start of the video segment component t2 of the adjacent data stream S1'.

Figure 13:
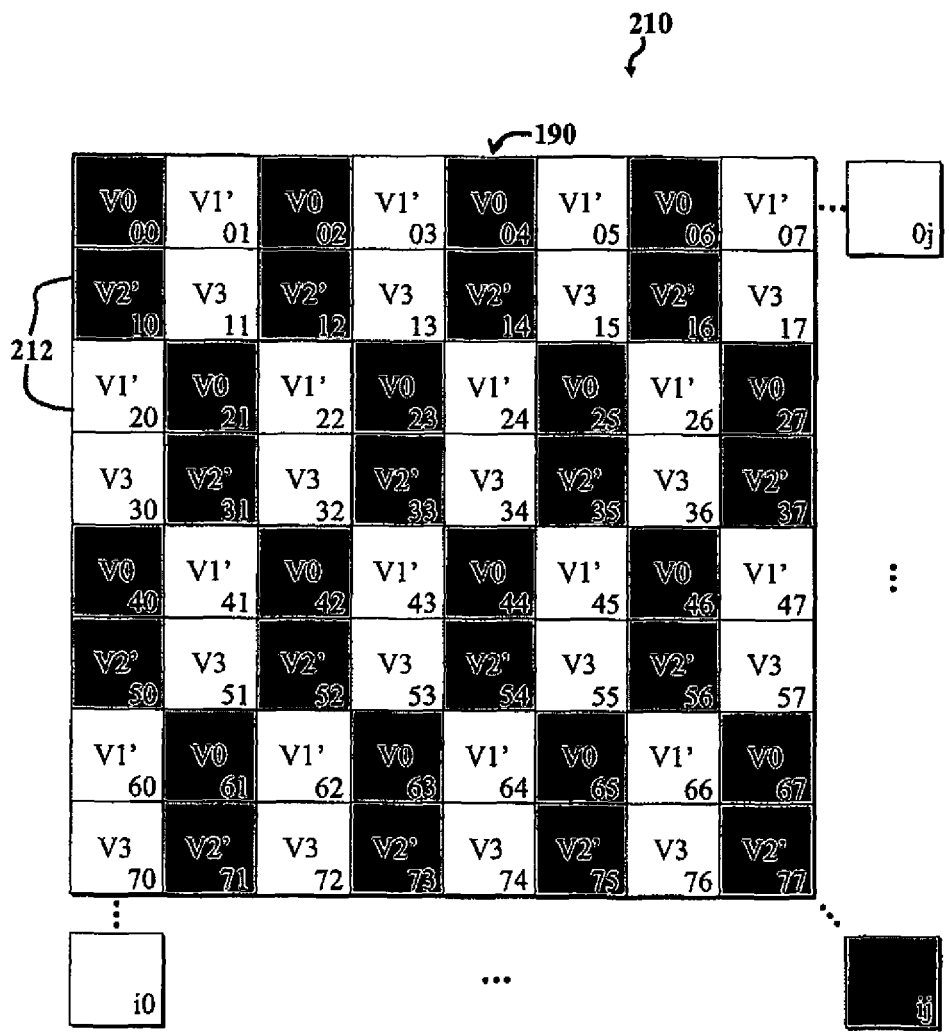
FIG. 13 is diagram of an example video frame partitioned in accordance with the video partitioning illustrated in FIG. 11 and showing an example data-loss pattern for the data-loss interval of FIG. 12 for a first video segment (t1).

FIG. 13 is diagram of the seventh example video frame 190 partitioned in accordance with the video partitioning illustrated in FIGS. 11 and 12 and showing an eighth example data-loss pattern 210 for the data-loss interval T.sub.L of FIG. 12 for the first video segment t1.

With reference to FIGS. 12 and 13, data in FIG. 12 is lost from data streams S0 and S2' for the first video segment t1. This results in the seventh example data-loss pattern 210. The seventh example data-loss pattern 210 includes alternating pairs of vertical pixels 212, wherein alternating pairs of rows have alternating lost 2.times.1 pairs of pixels that are offset by one pixel relative to adjacent pairs of rows. The seventh example data-loss pattern 210 is said to exhibit vertically biased paired diagonal loss, since the vertical 2.times.1 pixel pairs occur diagonally across the seventh example video frame 190.

Figure 14:
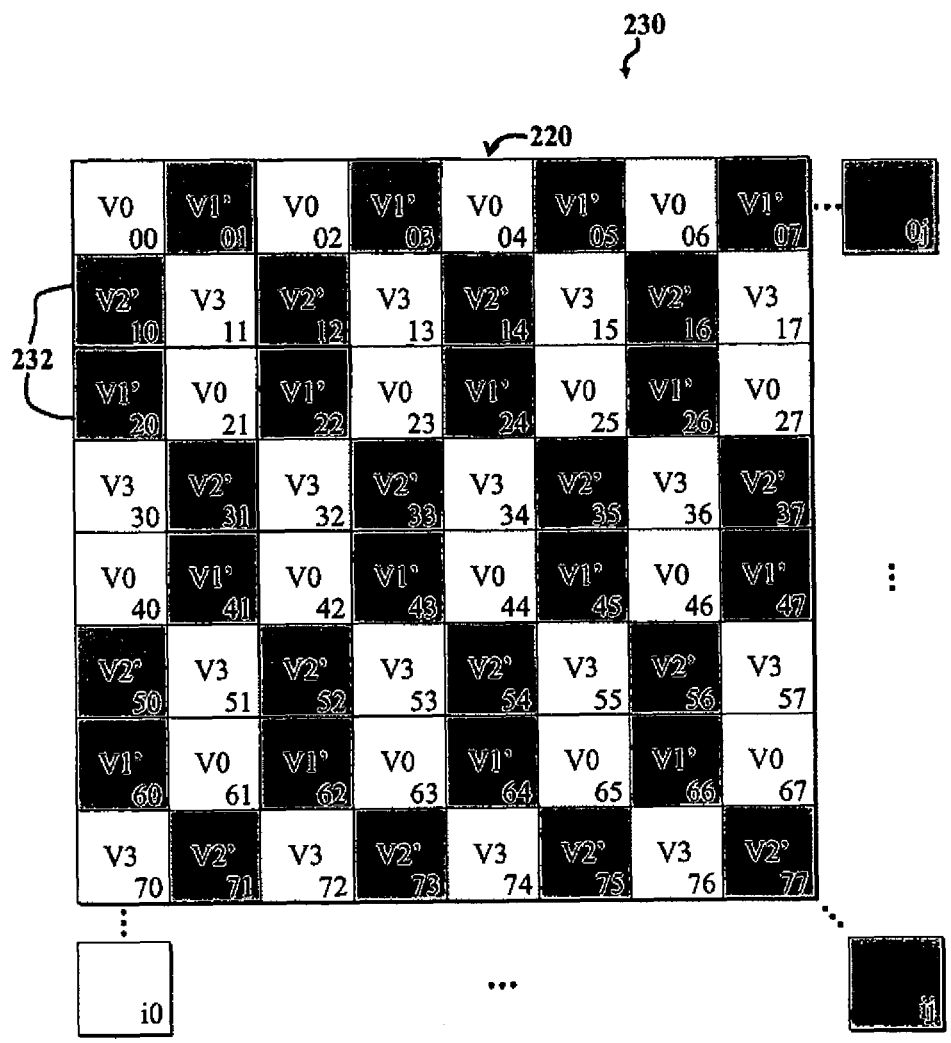
FIG. 14 is diagram of the example video frame partitioned in accordance with the video partitioning illustrated in FIG. 11 and showing example data-loss pattern for the data-loss interval of FIG. 12 for a second video segment (t2).

FIG. 14 is diagram of an eighth example video frame 220 partitioned in accordance with the video partitioning illustrated in FIGS. 11 and 12 and showing an eighth example data-loss pattern 230 for the data-loss interval T.sub.L of FIG. 12 for the second video segment t2.

With reference to FIGS. 12 and 14, data streams S1' and S2', which include pixels labeled V1' and V2', respectively, experience data loss during the data-loss interval T.sub.L of FIG. 12 for the second video segment t2. Hence, the eighth data-loss pattern 230 shows missing or corrupted data 232 corresponding to data streams S1' and S2'. The missing or corrupted data 232 exhibits vertically biased paired diagonal loss.

Figure 15:
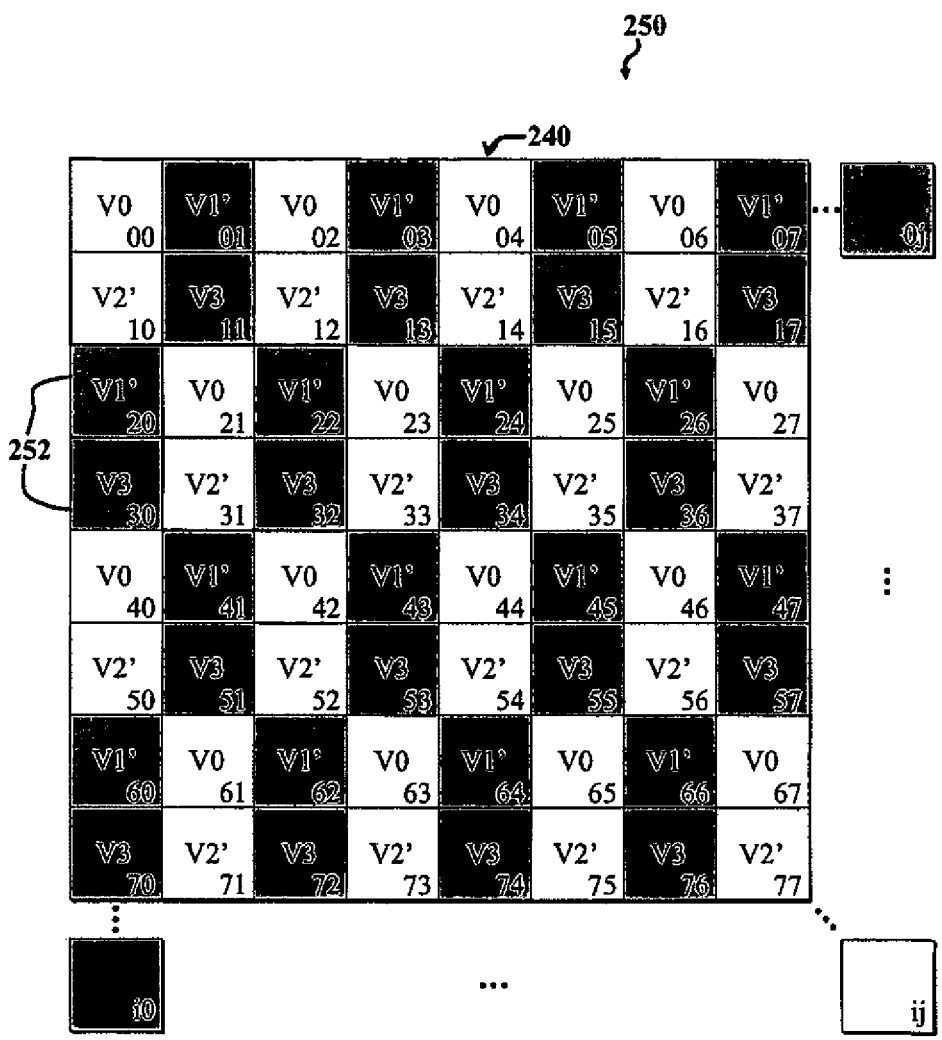
FIG. 15 is diagram of the example video frame of FIG. 11 showing an example data-loss pattern for the data-loss interval of FIG. 12 for a third video segment (t3).

FIG. 15 is diagram of a ninth example video frame 240 partitioned in accordance with the video partitioning illustrated in FIGS. 11 and 12 and showing a ninth example data-loss pattern 250 for the data-loss interval T.sub.L of FIG. 12 for third video segment t3.

With reference to FIGS. 12 and 15, the data streams S1' and S3, which include pixels labeled V1' and V3, respectively, experience data loss during the data-loss interval T.sub.L of FIG. 12 for the third video segment t3. This results in the ninth data-loss pattern 250, which includes missing or corrupted vertical pairs 252 of pixels exhibiting vertically biased paired diagonal loss.

Figure 16:
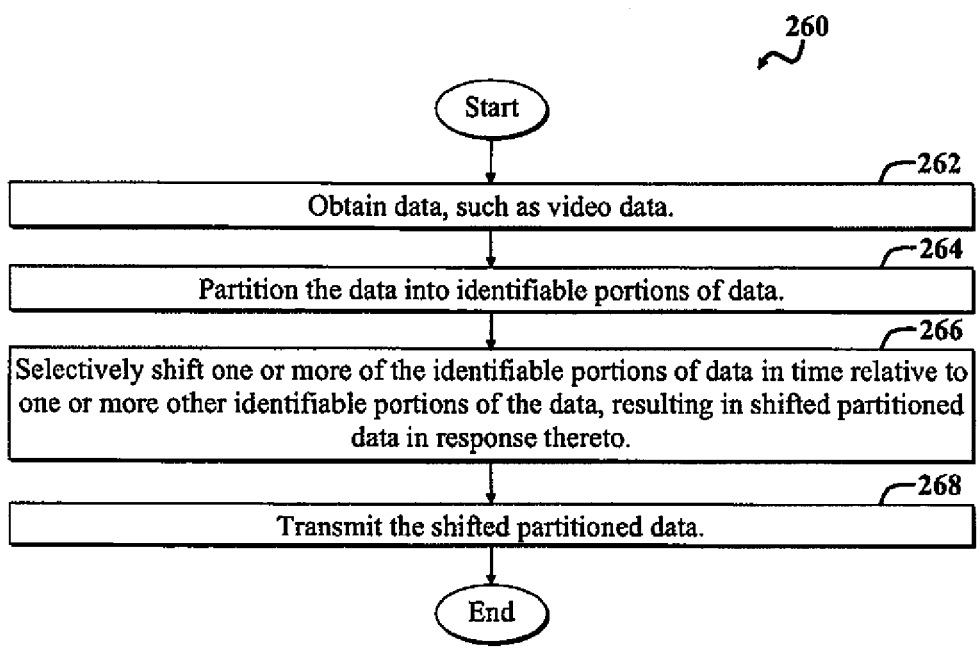
FIG. 16 is a flow diagram of a first example method suitable for use with the communications system of FIG. 1.

FIG. 16 is a flow diagram of a first example method 260 suitable for use with the communications system 10 of FIG. 1. The method 260 includes a first step 262, which includes obtaining data.

A second step 254 includes partitioning the data into identifiable portions of data, also called partitions or lattices. With reference to FIG. 3a, example identifiable portions of data may include the data streams S0-S3 and the accompanying segments t0-t5. Note that identifiable portions of data may include more or fewer than 4 data streams without departing from the scope of the present teachings.

A third step 266 includes selectively shifting one or more of the identifiable portions of data relative to one or more other identifiable portions of the data, resulting in shifted partitioned data in response thereto. The data streams S0-S3 of FIG. 3a represent shifted portions of data, where the segments t0-t5 are transmitted at different times in the different data streams S0-S3.

For the purposes of the present discussion, shifting of a first portion of data relative to another potion of data may mean adjusting the first or second portions of data so that when the portions of data are transmitted or sent, they are transmitted or sent at a different times relative to each other than they would be if they were not shifted. For example, if a first portion and a second portion of data are typically transmitted approximately simultaneously, such that corresponding segments (e.g. segments identified by t0-t5 in FIG. 3a) of the portions are temporally aligned, shifting of the first portion of data relative to the second portion of data would result in transmission of the corresponding segments at different times, such that the segments are not temporally aligned.

A fourth step 268 includes transmitting the shifted and partitioned data. The data may be transmitted over a network, wireless communications channel, or via another medium.

Figure 17:
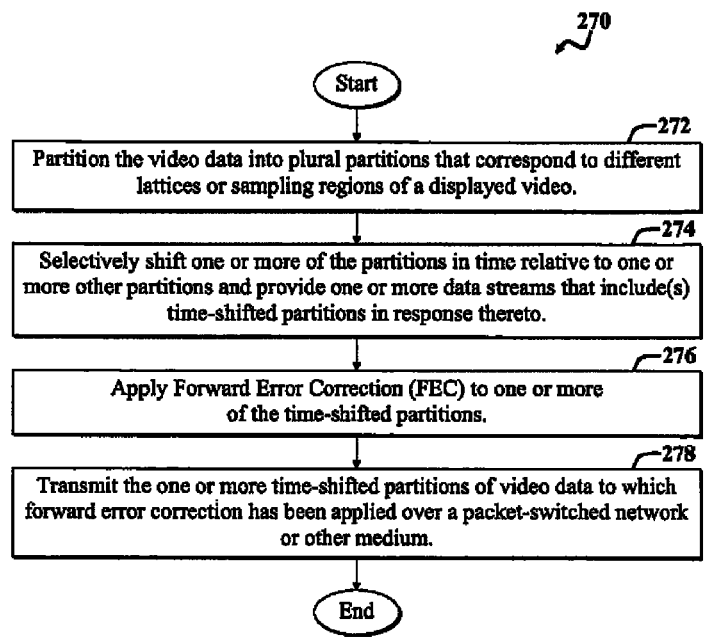
FIG. 17 is a flow diagram of a second example method suitable for use with the communications system of FIG. 1.

FIG. 17 is a flow diagram of a second example method 260 suitable for use with the communications system 10 of FIG. 1. The second example method 260 includes a partitioning step 272, which includes partitioning video data into plural partitions that correspond to different lattices or sampling regions of a displayed video.

A subsequent shifting step 274 includes selectively shifting one or more of the partitions in time relative to one or more other partitions and providing one or more data streams that include(s) time-shifted partitions in response thereto.

Next, an FEC step 226 includes applying forward error correction to one or more of the time-shifted partitions. This results in one or more time-shifted partitions of video data and redundant data incorporated for implementing forward error correction to protect the video data when transmitted.

A subsequent transmission step 278 includes transmitting the one or more time-shifted partitions of video data to which forward error correction has been applied over a packet-switched network or other medium.

Note that various steps of the methods 260 and 270 may be replaced with other steps. In addition, certain steps may be interchanged with other steps, and additional or fewer steps may be included. For example, the method 270 could include applying anti-aliasing filtration to the video data, compressing the video data, and so on. In addition, a receiving step may be included, wherein transmitted video data is received, and any data losses in the received video data that are not repaired by FEC processing may be concealed via interpolation techniques. In addition, a receiver may subscribe to all of the identifiable partitions of video data or a subset thereof. Furthermore, chroma pixel information may be separated from luma pixel information in a given frame and treated separately. Other modifications to the methods 260 and 270 of FIGS. 15 and 16 may be made without departing from the scope of the present teachings.

An alternative method includes partitioning an initial data stream corresponding to an input video signal into two or more data streams or other identifiable partitions or portions as discussed herein. The data streams may then each be selectively assigned different Scalable Video Coding (SVC) enhancement layers. Alternatively, a first set of data streams is implemented as discussed herein, and a second set of data streams is implemented as a set of SVC enhancement layers.

While certain embodiments discussed herein are discussed primarily with respect to the processing and transport of video data, embodiments are not limited thereto. For example, other types of data, such as audio data, text, or other types of data may be partitioned, shifted, and transmitted in accordance with the present teachings without departing from the scope thereof.

While various embodiments disclosed herein have has been discussed with respect to creation of four data streams from a single initial data stream corresponding to an input video signal, embodiments are not limited thereto. For example, certain embodiments may partition an initial data stream corresponding to an input video signal into two or more data streams that are transmitted in parallel. Alternatively, certain portions of an initial data stream corresponding to an input video signal may be selectively rearranged and transmitted in a single data stream rather than in separate parallel data streams without departing from the scope of the present teachings. Furthermore the initial data stream corresponding to an input video signal itself may include plural parallel data streams rather than a single data stream lacking sub-streams.

Although a process of the present invention may be presented as a single entity, such as software, instructions, or routines executing on a single machine, such software, instructions, or routines can readily be executed on multiple machines. That is, there may be multiple instances of a given software program, a single program may be executing on two or more processors in a distributed processing environment, parts of a single program may be executing on different physical machines, etc. Furthermore, two different programs, such as an FEC and an LCALC program, can be executing in a single machine, or in different machines. A single program can be operating as an FEC for one data-processing operation and as a LCALC for a different data-processing operation.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. For example, while partitioning has been described herein as operating primarily upon video frames, other portions, arrangements or groupings of video can be subjected to partitioning. For example, groups of pictures (GOPs), pictures, frames, or other layers or portions of video content may be subjected to partitioning.

This application is related to U.S. patent application Ser. No. 12/141,015, issued on Apr. 22, 2014 as U.S. Pat. No. 8,705,631, entitled "TIME-SHIFTED TRANSPORT OF MULTI-LATTICED VIDEO FOR RESILIENCY FROM BURST-ERROR EFFECTS", filed concurrently and U.S. patent application Ser. No. 12/141,017, issued on Apr. 15, 2014 as U.S. Pat. No. 8,699,578, entitled "METHODS AND SYSTEMS FOR PROCESSING MULTI-LATTICED VIDEO STREAMS", filed concurrently, both of which are incorporated by reference in their entirety for all purposes.

Any suitable programming language can be used to implement the routines or other instructions employed by various network entities. Example programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", "a specific embodiment", of "an implementation" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a computer-readable storage medium or device to permit a computing system to perform any of the methods described above.

Additionally, any signal arrows in the drawings/figures should be considered only as examples, and not limiting, unless otherwise specifically noted. For example, an arrow on a signal path indicating communication in one direction does not necessitate that communication along that signal path is limited to that one direction.

Furthermore, the term "or" as used herein is generally intended to mean "and/or" unless otherwise indicated. In addition, the term "includes" is taken to mean "includes but is not limited to." Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for reconstructing and outputting a received multi-latticed video signal, the method comprising:

receiving a video stream, wherein the video stream includes one or more representations of a video signal, wherein each of the one or more representations of the video signal (OOMROTVS) includes a respective sequence of pictures, wherein each picture of each of the OOMROTVS represents a respectively corresponding picture of the video signal;

generating plural decompressed pictures of the OOMROTVS, wherein each of the plural decompressed pictures is a decompressed version of a respectively corresponding received picture of the OOMROTVS, wherein each decompressed picture represents the same picture of the video signal as its respectively corresponding received picture; and determining plural sets of one or more associated pictures, wherein each picture in each determined set of one or more associated pictures (DSOOOMAP) represents the same respective picture of the video signal, wherein each respective DSOOOMAP includes at most one picture of each of the OOMROTVS; and outputting plural reconstructed pictures, wherein each of the plural reconstructed pictures respectively corresponds to a DSOOOMAP, wherein each of the plural reconstructed pictures comprises information corresponding to one or more decompressed pictures of its respectively corresponding DSOOOMAP.

2. The method of claim 1, wherein over a first time interval a first representation of the video signal (FROTVS) is received in the video stream, wherein over a second interval a second representation of the video signal (SROTVS) is received in the video stream, wherein the received FROTVS includes at least an impaired portion, wherein each successive received picture of the FROTVS and each successive received picture of the SROTVS are determined to be associated pictures, and further comprising: outputting reconstructed pictures corresponding to the associated pictures of the FROTSVS and SROTVS without information corresponding to decompressed pictures from the at least impaired portion of the FROTSVS.

3. The method of claim 1, wherein each of the plural reconstructed pictures is reconstructed in accordance with plural pixel sampling lattices (PPSL), wherein each of the PPSL is associated with a respectively corresponding representation of a video signal, and wherein the number of pixel sampling lattices in the PPSL is greater than the number of representations of the video signal in the received video stream.

4. The method of claim 1, wherein each of the plural reconstructed pictures is reconstructed in accordance with plural pixel sampling lattices (PPSL), wherein each of the PPSL is associated with a decimated version of each respective picture of the video signal, and wherein each picture in each DSOOOMAP corresponds to a decimated version of each respective picture of the video signal.

5. The method of claim 4, wherein a first reconstructed pictures comprises information corresponding to a first plurality of decompressed pictures, and wherein the number of decompressed pictures in the first plurality of decompressed pictures equals the number of pixel sampling lattices in the PPSL.

6. The method of claim 5, wherein a second reconstructed pictures comprises information corresponding to a second plurality of decompressed pictures, and wherein the number of decompressed pictures in the second plurality of decompressed pictures is less than the number of pixel sampling lattices in the PPSL.

7. The method of claim 5, wherein each decompressed picture in the second plurality of decompressed pictures respectively corresponds one of the PPSL, wherein the second reconstructed pictures further comprises of derived information from the second plurality of decompressed pictures, and wherein the derived information is included in pixel locations of the second reconstructed picture corresponding to a subset of the PPSL not corresponding to second plurality of decompressed pictures.

8. An apparatus for reconstructing and outputting plural representations of a video signal in a video stream, the apparatus comprising:

a processor; a processor-readable medium including one or more instructions for:

receiving a video stream, wherein the video stream includes plural representations of a video signal, wherein each of the plural representations of the video signal (PROTVS) includes a respective sequence of compressed pictures, wherein each of the PROTVS is associated with a respective pixel sampling lattice used to decimate each picture of the video signal, wherein each compressed picture of each of the PROTVS represents a respectively corresponding decimated picture of the video signal; determining plural sets of one or more associated compressed pictures of the PROTVS, wherein each compressed picture in each determined set of one or more associated compressed pictures (DSOOOMACP) represents the same respective picture of the video signal, wherein each respective DSOOOMACP includes at most one received compressed picture of each of the PROTVS; and outputting plural pictures, wherein each output picture respectively corresponds to a DSOOOMACP, wherein a first plurality of pixels of each output picture comprises of information corresponding to the respective decompressed version of the compressed pictures in the respectively corresponding DSOOOMACP, and a second plurality of the pixels of each output picture comprises of information derived from the compressed pictures in the respectively corresponding DSOOOMACP.

9. The apparatus of claim 8, wherein second plurality of the pixels of each output picture corresponds to impaired pixels in the one or more received compressed pictures that represent the same respective picture of the video signal.

10. The apparatus of claim 8, wherein the number of compressed pictures in at least one DSOOOMACP respectively corresponding to an output picture is less than a number of compressed pictures in plural transmitted representations of a video signal in the video stream.

11. An apparatus for reconstructing and outputting plural representations of a video signal in a video stream, the apparatus comprising:

a processor; a processor-readable medium including one or more instructions for:

receiving a video stream, wherein the video stream includes one or more representations of a video signal, wherein each of the one or more representations of the video signal (OOMROTVS) includes a respective sequence of pictures, wherein each picture of each of the OOMROTVS represents a respectively corresponding picture of the video signal;

generating plural decompressed pictures of the OOMROTVS, wherein each of the plural decompressed pictures is a decompressed version of a respectively corresponding received picture of the OOMROTVS, wherein each decompressed picture represents the same picture of the video signal as its respectively corresponding received picture; and determining plural sets of one or more associated pictures, wherein each picture in each determined set of one or more associated pictures (DSOOOMAP) represents the same respective picture of the video signal, wherein each respective DSOOOMAP includes at most one picture of each of the OOMROTVS; and outputting plural reconstructed pictures, wherein each of the plural reconstructed pictures respectively corresponds to a DSOOOMAP, wherein each of the plural reconstructed pictures comprises information corresponding to one or more decompressed pictures of its respectively corresponding DSOOOMAP.

12. The apparatus of claim 11, wherein over a first time interval a first representation of the video signal (FROTVS) is received in the video stream, wherein over a second interval a second representation of the video signal (SROTVS) is received in the video stream, wherein the received FROTVS includes at least an impaired portion, wherein each successive received picture of the FROTVS and each successive received picture of the SROTVS are determined to be associated pictures, and further comprising: outputting reconstructed pictures corresponding to the associated pictures of the FROTSVS and SROTVS without information corresponding to decompressed pictures from the at least impaired portion of the FROTSVS.

13. The apparatus of claim 11, wherein each of the plural reconstructed pictures is reconstructed in accordance with plural pixel sampling lattices (PPSL), wherein each of the PPSL is associated with a respectively corresponding representation of a video signal, and wherein the number of pixel sampling lattices in the PPSL is greater than the number of representations of the video signal in the received video stream.

14. The apparatus of claim 11, wherein each of the plural reconstructed pictures is reconstructed in accordance with plural pixel sampling lattices (PPSL), wherein each of the PPSL is associated with a decimated version of each respective picture of the video signal, and wherein each picture in each DSOOOMAP corresponds to a decimated version of each respective picture of the video signal.

15. The apparatus of claim 14, wherein a first reconstructed pictures comprises information corresponding to a first plurality of decompressed pictures, and wherein the number of decompressed pictures in the first plurality of decompressed pictures equals the number of pixel sampling lattices in the PPSL.

16. The apparatus of claim 15, wherein a second reconstructed pictures comprises information corresponding to a second plurality of decompressed pictures, and wherein the number of decompressed pictures in the second plurality of decompressed pictures is less than the number of pixel sampling lattices in the PPSL.

17. The apparatus of claim 15, wherein each decompressed picture in the second plurality of decompressed pictures respectively corresponds one of the PPSL, wherein the second reconstructed pictures further comprises of derived information from the second plurality of decompressed pictures, and wherein the derived information is included in pixel locations of the second reconstructed picture corresponding to a subset of the PPSL not corresponding to second plurality of decompressed pictures.

18. The apparatus of claim 11, wherein the number of compressed pictures in at least one DSOOOMACP respectively corresponding to an output picture is less than a number of compressed pictures in plural transmitted representations of a video signal in the video stream.

19. The apparatus of claim 11, wherein the video stream is comprised of frames, wherein matrices of each frame include 4×4 non-overlapping groups of adjacent or contiguous pixels.

20. The apparatus of claim 11, wherein the video stream is comprised of frames, wherein matrices of each frame include alternating mapped matrices in scan order that differ in size.

* * * * *